(12) United States Patent
Warner et al.

(10) Patent No.: US 7,012,323 B2
(45) Date of Patent: Mar. 14, 2006

(54) MICROELECTRONIC ASSEMBLIES INCORPORATING INDUCTORS

(75) Inventors: Michael Warner, San Jose, CA (US); Belgacem Haba, Cupertino, CA (US); Masud Beroz, Livermore, CA (US)

(73) Assignee: Tessera, Inc., San Jose, CA (US)

( * ) Notice: Subject to any disclaimer, the term of this patent is extended or adjusted under 35 U.S.C. 154(b) by 0 days.

(21) Appl. No.: 10/452,333

(22) Filed: Jun. 2, 2003

(65) Prior Publication Data

US 2004/0032011 A1    Feb. 19, 2004

Related U.S. Application Data

(63) Continuation-in-part of application No. PCT/US02/27509, filed on Aug. 28, 2002, and a continuation-in-part of application No. 10/210,160, which is a continuation-in-part of application No. 10/210,160, filed on Aug. 1, 2002, now Pat. No. 6,856,007.

(60) Provisional application No. 60/315,408, filed on Aug. 28, 2001.

(51) Int. Cl.
*H01L 23/48* (2006.01)

(52) U.S. Cl. .................... 257/676; 257/676; 257/678
(58) Field of Classification Search ................ 257/676, 257/678, 692, 773, 723, 724
See application file for complete search history.

(56) References Cited

U.S. PATENT DOCUMENTS

| | | | |
|---|---|---|---|
| 4,774,630 A | 9/1988 | Reisman et al. | |
| 4,827,376 A | 5/1989 | Voss | |
| 5,148,265 A | 9/1992 | Khandros et al. | |
| 5,148,266 A | 9/1992 | Khandros et al. | |
| 5,285,352 A | 2/1994 | Pastore et al. | |
| 5,382,829 A | 1/1995 | Inoue | |
| 5,438,305 A | 8/1995 | Hikita et al. | |
| 5,473,190 A | 12/1995 | Inoue et al. | |
| 5,486,720 A | 1/1996 | Kierse | |
| 5,491,302 A | 2/1996 | DiStefano et al. | |
| 5,518,964 A | 5/1996 | DiStefano et al. | |
| 5,530,288 A | 6/1996 | Stone | |
| 5,536,909 A | 7/1996 | DiStefano et al. | |
| 5,557,501 A | 9/1996 | DiStefano et al. | |
| 5,576,680 A | 11/1996 | Ling | |
| 5,608,262 A | 3/1997 | Degani et al. | |
| 5,629,241 A * | 5/1997 | Matloubian et al. | ........ 438/125 |

(Continued)

FOREIGN PATENT DOCUMENTS

JP        05-04762     2/1993

(Continued)

*Primary Examiner*—David Nelms
*Assistant Examiner*—Thinh T Nguyen
(74) *Attorney, Agent, or Firm*—Lerner, David, Littenberg, Krumholz & Mentlik, LLP

(57) ABSTRACT

Inductors are provided in chip assemblies such as in packaged semiconductor chips. The inductors may be incorporated in a chip carrier which forms part of the package, and may include, for example, spiral or serpentine inductors formed from traces on the chip carrier. The chip carrier may include a flap bearing the inductive element, and this flap may be bent to tilt the inductive element out of the plane of the chip carrier to reduce electromagnetic interaction between the inductive element and surrounding electrical components. Other inductors include solenoids formed in part by leads on the chip carrier as, for example, by displacing leads out of the plane of the chip carrier to form loops in vertically-extensive planes transverse to the plane of the chip carrier. Additional features provide trimming of the inductor to a desired inductance value during by breaking or connecting leads during assembly.

20 Claims, 31 Drawing Sheets

U.S. PATENT DOCUMENTS

| | | |
|---|---|---|
| 5,633,785 A | 5/1997 | Parker et al. |
| 5,642,261 A | 6/1997 | Bond et al. |
| 5,659,952 A | 8/1997 | Kovac et al. |
| 5,677,569 A | 10/1997 | Choi et al. |
| 5,679,977 A | 10/1997 | Khandros et al. |
| 5,688,716 A | 11/1997 | DiStefano et al. |
| 5,707,174 A | 1/1998 | Garren |
| 5,717,245 A | 2/1998 | Pedder |
| 5,747,870 A | 5/1998 | Pedder |
| 5,757,074 A * | 5/1998 | Matloubian et al. ........ 257/702 |
| 5,766,987 A | 6/1998 | Mitchell et al. |
| 5,787,581 A | 8/1998 | DiStefano et al. |
| 5,798,286 A | 8/1998 | Faraci et al. |
| 5,821,609 A | 10/1998 | DiStefano et al. |
| 5,830,782 A | 11/1998 | Smith et al. |
| 5,869,887 A | 2/1999 | Urushima |
| 5,869,894 A | 2/1999 | Degani et al. |
| 5,886,393 A | 3/1999 | Merrill et al. |
| 5,892,417 A | 4/1999 | Johnson et al. |
| 5,895,972 A | 4/1999 | Paniccia |
| 5,905,639 A | 5/1999 | Warren |
| 5,913,109 A | 6/1999 | DiStefano et al. |
| 5,915,752 A | 6/1999 | DiStefano et al. |
| 5,918,112 A | 6/1999 | Shah et al. |
| 5,929,517 A | 7/1999 | DiStefano et al. |
| 5,973,391 A | 10/1999 | Bischoff et al. |
| 5,976,913 A | 11/1999 | DiStefano |
| 6,005,466 A | 12/1999 | Pedder |
| 6,037,659 A | 3/2000 | Weixel |
| 6,046,076 A | 4/2000 | Mitchell et al. |
| 6,049,972 A | 4/2000 | Link et al. |
| 6,054,756 A | 4/2000 | DiStefano et al. |
| 6,075,289 A | 6/2000 | DiStefano |
| 6,081,035 A | 6/2000 | Warner et al. |
| 6,093,888 A | 7/2000 | Laureanti et al. |
| 6,104,272 A | 8/2000 | Yamamoto et al. |
| 6,124,546 A | 9/2000 | Hayward et al. |
| 6,133,626 A | 10/2000 | Hawke et al. |
| 6,156,980 A | 12/2000 | Peugh et al. |
| 6,165,814 A | 12/2000 | Wark et al. |
| 6,169,328 B1 | 1/2001 | Mitchell et al. |
| 6,181,015 B1 | 1/2001 | Gotoh et al. |
| 6,194,774 B1 | 2/2001 | Cheon |
| 6,218,729 B1 | 4/2001 | Zavrel, Jr. et al. |
| 6,228,686 B1 | 5/2001 | Smith et al. |
| 6,229,200 B1 | 5/2001 | McLellan et al. |
| 6,238,949 B1 | 5/2001 | Nguyen et al. |
| 6,238,950 B1 | 5/2001 | Howser et al. |
| 6,249,039 B1 | 6/2001 | Harvey et al. |
| 6,252,778 B1 | 6/2001 | Tonegawa et al. |
| 6,255,714 B1 | 7/2001 | Kossives et al. |
| 6,274,937 B1 * | 8/2001 | Ahn et al. ................. 257/777 |
| 6,281,570 B1 | 8/2001 | Kameyama et al. |
| 6,292,086 B1 | 9/2001 | Chu |
| 6,310,386 B1 | 10/2001 | Shenoy |
| 6,323,735 B1 | 11/2001 | Welland et al. |
| 6,326,696 B1 | 12/2001 | Horton et al. |
| 6,329,715 B1 | 12/2001 | Hayashi |
| 6,344,688 B1 | 2/2002 | Wang |
| 6,353,263 B1 | 3/2002 | Dotta et al. |
| 6,362,525 B1 | 3/2002 | Rahim |
| 6,377,464 B1 | 4/2002 | Hashemi et al. |
| 6,387,747 B1 | 5/2002 | Cha et al. |
| 6,492,201 B1 | 12/2002 | Haba |
| 6,498,099 B1 | 12/2002 | McLellan et al. |
| 6,521,987 B1 | 2/2003 | Glenn et al. |
| 6,583,513 B1 | 6/2003 | Utagikar et al. |
| 2001/0033478 A1 | 10/2001 | Ortiz et al. |
| 2002/0017699 A1 | 2/2002 | Shenoy |

FOREIGN PATENT DOCUMENTS

| | | |
|---|---|---|
| WO | IB-97/11588 A1 | 3/1997 |

* cited by examiner

MICROELECTRONIC ASSEMBLIES INCORPORATING INDUCTORS

CROSS-REFERENCE TO RELATED APPLICATIONS

This application is a continuation-in-part of International Patent Application PCT/US02/27509 designating the U.S., filed Aug. 28, 2002, which in turn is a continuation-in-part of U.S. patent application Ser. No. 10/210,160, filed Aug. 1, 2002 now U.S. Pat. No. 6,856,007, which in turn claims benefit of U.S. Provisional Patent Application Ser. No. 60/315,408 filed Aug. 28, 2001. This application is also a continuation-in-part of said U.S. patent application Ser. No. 10/210,160, filed Aug. 1, 2002 now U.S. Pat. No. 6,856,007, which in turn claims benefit of U.S. Provisional Patent Application Ser. No. 60/315,408 filed Aug. 28, 2001. The disclosures of the above-mentioned applications are hereby incorporated by reference herein.

BACKGROUND OF THE INVENTION

The present application relates to microelectronic assemblies including inductors, and to components and methods useful in making such assemblies.

Semiconductor chips or dies commonly are provided in packages that facilitate handling of the chip during manufacture and mounting of the chip on an external substrate such as a circuit board or other circuit panel. For example, certain packaged semiconductor chips sold under the registered trademark μBGA® by Tessera, Inc., assignee of the present application, incorporate a dielectric element having terminals. The terminals are connected to contacts on the die itself. In particularly preferred arrangements, the connections between the terminals and the die are formed by flexible leads and the dielectric element, its mounting to the die or both are arranged so that the terminals remain moveable with respect to the chip. For example, where the dielectric element overlies a surface of the chip, a layer of a compliant material may be provided between the dielectric element and the chip. The packaged chip can be mounted to a circuit board or other underlying circuit panel by soldering or otherwise bonding the terminals on the dielectric element to contact pads on the circuit board. Because the terminals on the dielectric element can move relative to the chip, the assembly can compensate for differential thermal expansion and contraction of the chip and the circuit board during thermal cycling in service, in storage and during manufacturing processes.

Assemblies of this type are described, for example, in U.S. Pat. Nos. 5,148,265; 5,148,266; and 5,679,977. In certain embodiments, the leads can be formed partially or wholly as elongated metallic strips extending from the terminals along the dielectric element. These strips can be connected to the contacts on the chip by wire bonds, so that the wire bonds and strips cooperatively constitute composite leads. In other embodiments, the strips themselves can be connected directly to the terminals. Certain methods of forming strip-like leads and connecting numerous strip-like leads to numerous contacts on a die are described in U.S. Pat. Nos. 6,054,756; 5,915,752; 5,787,581; 5,536,909; 5,390,844; 5,491,302; 5,821,609; and 6,081,035, the disclosures of which are incorporated by reference herein.

The aforementioned structures, in their preferred embodiments, provide packaged chips with numerous advantageous including the aforementioned ability to compensate for differential thermal expansion and hence high reliability; compatibility with surface-mounting techniques for assembling components to a circuit board and the ability to accommodate numerous connections to the chip in a compact assembly. Some of these packages occupy an area of the circuit board just slightly larger than the area of the chip itself. Certain preferred packages of this type provide short, strip-like leads which minimize self-inductance in the leads and hence provide good high-frequency signal propagation. Moreover, certain packages according to this design can provide good heat dissipation from the chip. These packages have been widely adopted for semiconductor chips in numerous applications.

Some circuits incorporating semiconductor chips also include so-called "passive" electronic components, such as inductors, resistors and capacitors. While some passive components can be incorporated in the semiconductor chip itself, this adds to the size and cost of the chip. Moreover, it is difficult to provide substantial inductance in chips fabricated using conventional chip-making techniques. It has been proposed to provide passive components in a packaged module with the chip itself, so as to provide a relatively compact unit, which can be handled and mounted in much the same way as a packaged semiconductor chip. Merely by way of example, certain modules incorporating inductors are shown in U.S. Pat. Nos. 5,973,391; 6,218,729; 6,310,386; 6,362,525; and 6,377,464; and Japanese Publication JP 05-04762 published Feb. 26, 1993. However, despite these efforts in the art, there have been needs for improvements in inductors suitable for use in microelectronic packages and in microelectronic packages incorporating inductors. There have been corresponding needs for improvements in the components and methods used to form such packages and inductors themselves.

SUMMARY OF THE INVENTION

Aspects of the invention provide structures such as chip packages or modules incorporating inductors, and provide particular structures for inductors in such structures and in other applications.

An assembly according to one aspect of the invention comprises a chip having a front surface with contacts thereon; and a substrate, desirably a generally planar substrate, overlying the front surface of the chip. The substrate includes a dielectric structure, which is desirably a generally planar structure, and a first inductor including one or more conductors extending in a spiral on the dielectric structure. The one or more conductors have one or more leads formed integrally therewith, at least one of the leads extending from the substrate to at least one of the contacts on the chip. As further discussed below, the substrate may be a substrate which performs other functions in the assembly as, for example, a chip carrier in a chip package which bears terminals for mounting the package to a circuit board or other external structure. The lead or leads formed integrally with the conductors constituting the inductor can be connected to the chip using the same bonding processes used to connect other leads on the substrate to the chip.

A further aspect of the invention provides a component for use in microelectronic assemblies. The component includes a substrate incorporating a metallic layer and dielectric layers on opposite sides of the metallic layer. The metallic layer desirably includes a ferromagnetic material. A solenoidal inductor including conductors extending on opposite sides of the metallic layer as, for example, first conductors extending at least in part on one of the dielectric layers and second conductors extending at least in part on the other one of the dielectric layers, these conductors being connected to one another to form a plurality of loops, at least some of these loops surrounding at least a part of the ferromagnetic material of the substrate. The substrate provides a high-inductance, compact inductor. Here again, the substrate desirably incorporates other features such as terminals and leads for forming other elements of a larger structure. Merely by way of example, the substrate may be a flexible substrate useful as a chip carrier in a chip package.

In accordance with another aspect of the invention, an inductive structure comprises a component including a dielectric element having one or more bond windows and leads extending to or across the bond windows, at least some of the parts of the leads lying substantially in a horizontal plane, where at least some of the parts of the leads are offset from the horizontal plane at the window or windows so that the leads at least partially define one or more vertically-extensive loops or turns. Each such loop or turn surrounds an area in a vertical or tilted plane.

For example, the bond window may be an elongated bond window and the leads may include leads of first and second sets interspersed with one another along a path extending in the direction of elongation of the bond window, the leads extending generally transverse to the path. The leads of the first set may extend across the bond window in the horizontal plane, whereas the leads of the second set may be offset from the horizontal plane at the bond window. The leads of the first set may be in series with one another, so as to form a set of turns, each turn including a lead of the first set and a lead of the second set. Such a component may be used in conjunction with a substrate such as a semiconductor chip; the vertically-offset leads of the second set may be attached to pads on the chip.

In another arrangement, the component includes a substrate incorporating a dielectric layer having first and second bond windows on opposite sides of an elongated path, and conductors extending transverse to the path, each such conductor incorporating a first lead portion aligned with the first bond window and a second lead portion aligned with the second bond window. The component is used in conjunction with a chip or other element having conductive units, each such conductive unit including first and second contacts exposed on the front face of the chip and a conductor extending between these contacts. In a completed assembly, the component desirably overlies the front face of the chip. The first lead portions are offset from the plane of the conductors and extend downwardly to the first contacts at the first bond window, whereas the second lead portions are similarly offset from the plane of the conductors and extend downwardly to the second contacts at the second bond window. The lead portions are connected to the contacts on the chip so as to form a solenoid with multiple turns, each including one conductive element of the component and one conductive unit of the chip. The component also can be used in conjunction with elements other than chips having similar conductive units.

A related aspect of the present invention provides methods of making inductors including the steps of providing a component with a dielectric element and leads extending at least partially across one or more bond windows in a horizontal plane, and displacing leads or portions of leads from such horizontal plane so as to form one or more vertically-extensive loops. Still further aspects of the invention provide components suitable for use in such methods.

Yet another aspect of the invention includes methods of making an inductor including the step of providing a dielectric element with one or more conductors extending thereon and modifying the conductors by selectively breaking one or more of the conductors, by selectively interconnecting one or more of the conductors or both, so as to leave a structure of interconnected conductors having a selected inductance. Such methods can be used, for example, to provide for "trimming" or adjustment of the inductance. Here again, the dielectric element may carry other structures, such as signal leads, terminals and the like, and may be a chip carrier or other element of a chip package or other microelectronic assemblage. The operations used in the modifying the conductors may be the same operations used to form other features of the package as, for example, the operations used to connect leads to a chip. A related aspect of the invention provides an assembly including a dielectric element with conductors thereon and a substrate as, for example, a semiconductor chip, with one or more pads thereon. A first pair of conductors on the dielectric element is connected to one of the pads on the substrate so that these conductors are interconnected with one another by such pad and form a composite conductor, which serves as part of an inductor. As further explained below, composite conductors of this nature can be formed selectively in an inductor-forming method.

In accordance with another embodiment of the invention, an assembly includes a substrate such as a chip, circuit panel or other structure having a surface and a component includes a dielectric element having a generally planar first part overlying the surface of a substrate and extending generally parallel to such surface. The dielectric element also has a second part, which is not parallel to the top surface. The component includes an inductor defined at least in part by one or more traces disposed on the second part of the dielectric element. As further explained below, this arrangement can substantially reduce inductive coupling between the inductor on the component and elements such as leads and potential planes on the substrate lying in planes parallel to the surface of the substrate. A related aspect of the invention provides methods of making microelectronic assemblies incorporating the steps of positioning the component and bending the second part of the dielectric element out of the plane of the first part. Preferably, the bending step is performed after positioning the component including the dielectric element over the substrate. Merely by way of example, a chip carrier can be positioned relative to a chip and a part of the dielectric element can be bent to lie along an edge of the chip or to project downwardly from the plane of the chip carrier to the chip.

The features of the foregoing aspects of the invention can be combined with one another or used separately. Still other objects, features and advantages of the present invention will be more readily apparent from the detailed description of the preferred embodiments set forth below, taken in conjunction with the accompanying drawings.

DETAILED DESCRIPTION

Figure 1:
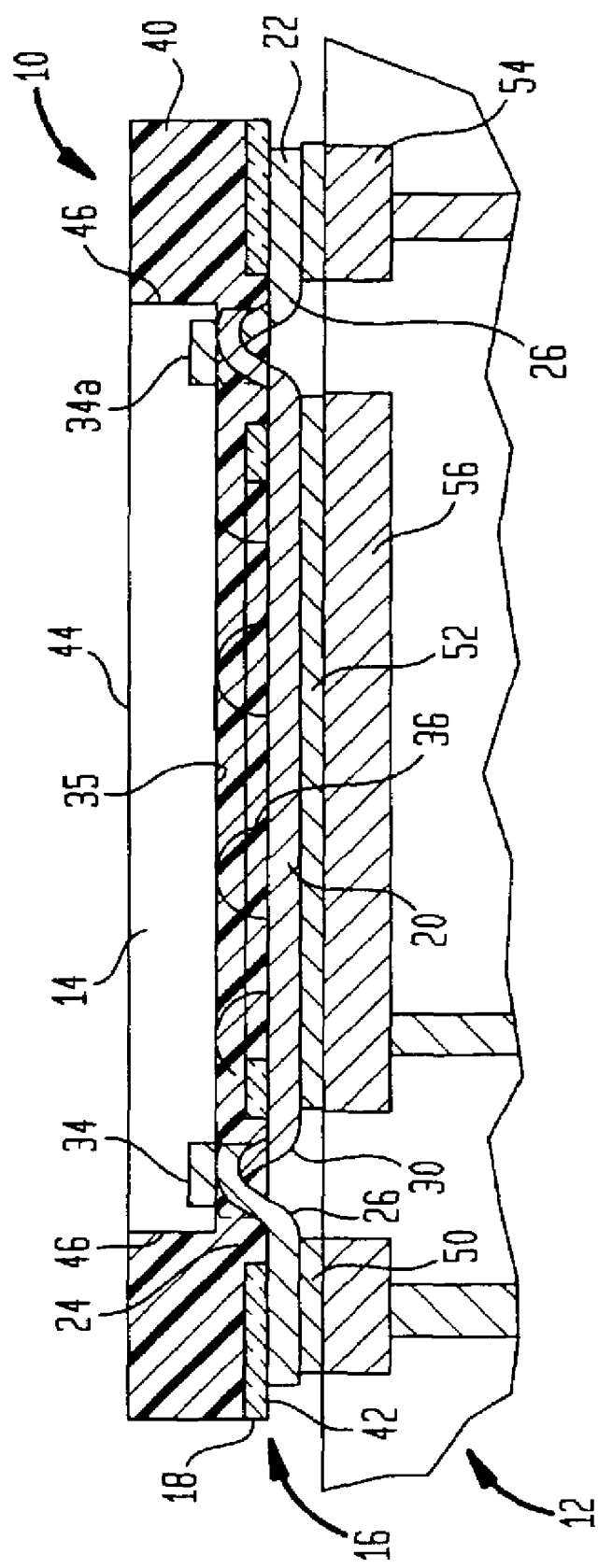
FIG. 1 is a diagrammatic sectional view of an assembly in accordance with one embodiment of the invention, including a packaged chip and a circuit board.
Figure 2:
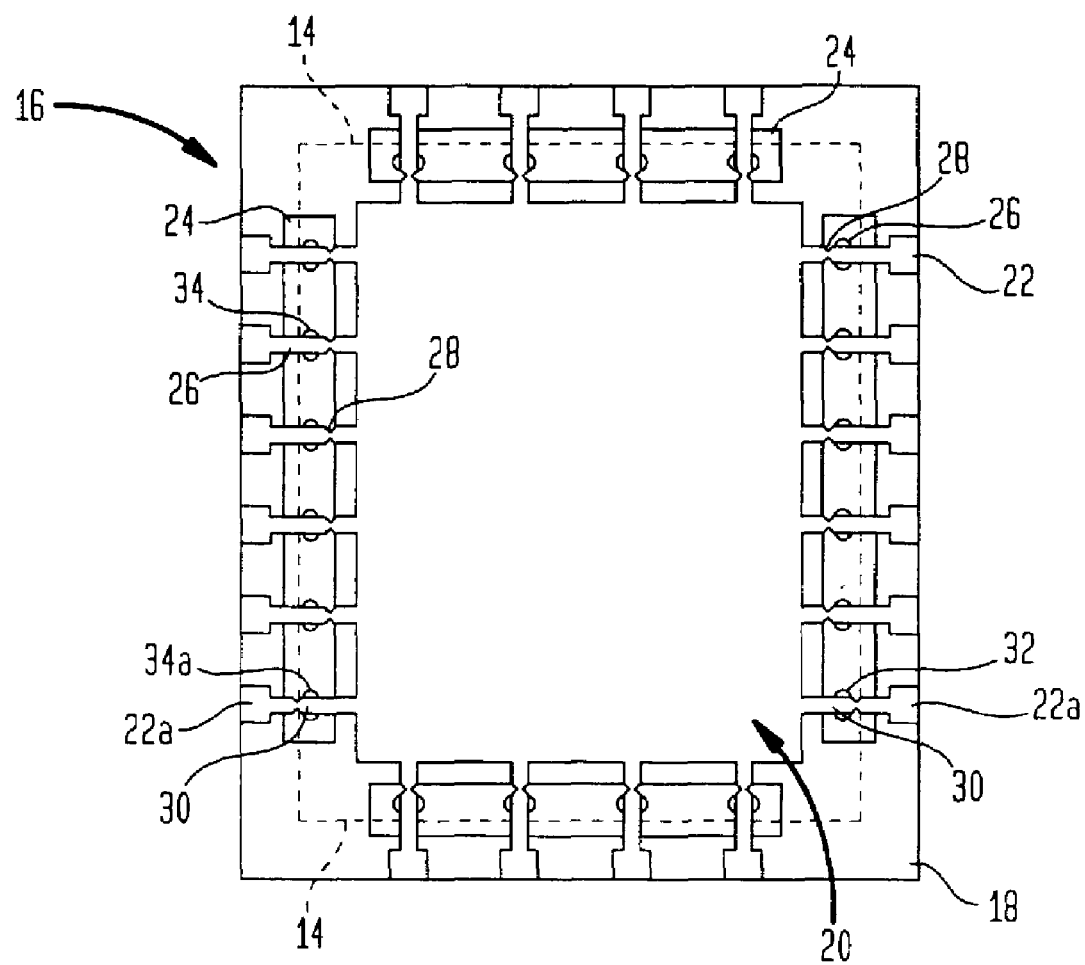
FIG. 2 is a diagrammatic plan view of the packaged chip depicted in FIG. 1 during one stage of manufacture.

As further discussed below, certain aspects of the invention provide inductors formed as elements of chip assemblies such as packaged chips or modules. Accordingly, a few non-limiting examples of such chip assemblies are discussed herein. FIG. 1 shows a diagrammatic sectional view of a chip assembly. The assembly includes a packaged chip 10 mounted to a circuit board 12. The packaged chip 10 includes a chip or "die" 14 and a chip carrier 16. FIG. 2 shows a diagrammatic plan view of the die 14 and chip carrier 16 of FIG. 1 at an intermediate stage during fabrication of the packaged chip. The chip carrier 16 includes a dielectric layer 18 which desirably is a thin, flexible layer of a polymeric dielectric as, for example, polyimide or BT resin. The chip carrier has a large metallic thermal conductor 20 in a central region and a plurality of terminals 22 in a peripheral region surrounding the central region. The dielectric also has apertures or bond windows 24 extending through the dielectric between the terminals and the thermal conductor. Each terminal 22 has a terminal lead 26 associated with it. Each terminal lead 26 has a connection section projecting inwardly from the associated terminal across one of the bond windows 24. Each terminal lead also has a frangible section 28 between the connection section and the thermal conductor, so that the connection sections of the various terminal leads are connected to the thermal conductor through the frangible sections.

A few of the leads are thermal conductor leads 30. The thermal conductor leads are similar to the terminal leads except that the connection sections of the thermal conductor leads are connected directly to thermal conductor 20, without an intervening frangible section. The end of the connection section of each thermal conductor lead 30 remote from thermal conductor 20 is connected to a "dummy" terminal 22a by a frangible section 32. Thus, the frangible sections of the thermal conductor leads are disposed adjacent the outer edges of the bond windows 24, remote from thermal conductor 20.

The terminals, leads and thermal conductor form an electrically continuous structure. Thus, the leads can be plated or otherwise subjected to processes requiring electrical current without the need for any additional electrical commoning element. Preferably, the thermal conductor, leads and terminals are formed from a single layer of copper or copper alloy about 10–30 microns thick, more preferably about 15–20 microns thick, on the dielectric layer. A photoresist can be applied and patterned using conventional techniques so that regions of the copper or copper alloy layer can be selectively removed so as to leave the terminals, thermal conductor and leads in place. In other processes, the thermal conductor, leads and terminals can be formed by selective deposition of one or more metals, such as by patterning a photoresist and plating in areas which are not covered by the photoresist. The bond windows can be formed by etching the dielectric or by exposing the dielectric to radiation such as laser radiation. The fabrication procedure for the chip carrier can be essentially as shown and described in the patents incorporated by reference. Also, although the frangible sections 28 and 32 are illustrated in FIG. 2 as having width less than the width of the connection sections, essentially any type of frangible section can be employed. For example, the leads may incorporate frangible sections of reduced thickness and/or of different metallurgical structure and/or composition from the connection sections.

In fabrication of the package semiconductor chip, a die 14 is juxtaposed with the chip carrier so that the front surface 35 of the die faces toward the chip carrier and so that contacts 34 on the die are substantially aligned with the bond windows and with the connection sections of the terminal leads. Desirably, the arrangement of the leads is selected so that ground contacts on the die are aligned with the thermal conductor leads. In one manufacturing process, the dielectric is supported temporarily above the front or contact-bearing surface of the die by a porous layer formed from a plurality of compliant elements or "nubbins" 36 (FIG. 1). As described in U.S. Pat. Nos. 5,706,174; 5,659,952; and 6,169,328, the disclosures of which are incorporated by reference herein, the nubbins typically are provided on the inner surface of the dielectric which faces toward the die. The connection sections of leads 26 and 30 may be bonded to the contacts by advancing a tool such as an ultrasonic or thermosonic bonding tool into the bond windows 24 so as to displace each connection section toward the die. This action breaks the frangible sections of the leads. Thus, the terminal leads 26 remain connected to terminals 22, and these terminals are disconnected from the thermal conductor. The thermal conductor leads 30 are disconnected from the associated dummy terminals 22a but remain connected to thermal conductor 20. Thus, at the end of the bonding process, the signal contacts 34 on the die are connected to the terminals whereas the ground contacts 34a are connected to the thermal conductor. The thermal conductor also serves as an anchor or support to facilitate breakage of the frangible sections associated with the terminal leads.

Following connection of the leads, the assembly is encapsulated by injecting a flowable, typically liquid encapsulant 40 between the die and the dielectric layer of the connection component. The encapsulant desirably also covers the edges 46 of the die, but does not cover the rear surface of the die. Techniques for applying an encapsulant are disclosed, for example, in U.S. Pat. Nos. 5,766,987; 6,049,972; and 6,046,076, the disclosures of which are also incorporated by reference herein. Typically, several connection components are provided as sections of a single dielectric layer tape, which incorporates several sets of terminals and several thermal conductors as aforesaid. Several chips are assembled to the various sets of terminals, and encapsulated, whereupon the tape is severed to provide individual packaged chips.

Other manufacturing processes can be employed. For example, the die can be attached to the connection component by a preformed pad of an adhesive material or "die attach" disposed between the front face 35 of the die and the connection component. Such a pad can be provided as a part of the connection component, or applied during the assembly operation. In another technique, die attach material is provided between the front face of the die and the connection component by dispensing a mass of uncured, flowable die attach onto the connection component or onto the die before assembling the die to the connection component.

After encapsulation, the packaged semiconductor chip has the configuration shown in FIG. 1. As best seen in that figure, the connection sections of the leads 26, 30 are bent toward the die and in contact with the contacts 34, 34a of the die. The encapsulant layer extends between the die and the dielectric element. In this embodiment, the terminals and thermal conductor are disposed on the bottom or outer surface 42 of the dielectric (the surface facing downwardly, away from the die in FIG. 1) and hence are exposed at this surface. The encapsulant surrounds the die but desirably does not overlie the rear surface 44 of the die, remote from the dielectric layer.

In this embodiment, the terminals are disposed outside of the lateral edges 46 of the die. Stated another way, the terminals "fan out" from the die.

The packaged semiconductor chip is provided with thin layers of solder 50 on the terminals 22, 22a and with a thin layer of solder 52 on thermal conductor 20. Such thin layers can be applied by application of solder paste and subsequent volatilization of the organic carrier from the paste or by wave-soldering or dip-soldering techniques. Desirably, the solder layers are less than about 75 microns thick, most preferably between 25 and 50 microns thick. The solder layers can be applied before severing the tape to form individual packaged chips.

In an assembly technique, the packaged semiconductor chip is assembled to a circuit board or other circuit panel 12 as shown in FIG. 1. In a single operation, using conventional surface-mounting soldering techniques, the terminals are soldered to the contact pads 54 of the circuit board, whereas the thermal conductor 20 is soldered to the thermal conductor mounting 56 of the circuit board. Most preferably, the bond between the thermal conductor and the thermal conductor mounting covers substantially the entire surface area of the thermal conductor, as, for example, at least about 80% of the thermal conductor surface area. Only a small fraction of the circuit board is illustrated. The contact pads 54 of the circuit board are connected by surface or internal connections of circuit panel 12 to appropriate signal-carrying traces and other electrical features of the circuit board, whereas the thermal conductor mounting 56 desirably is connected to a source of ground potential or other constant potential. Thus, after soldering the die is electrically connected to the appropriate signal connections of the circuit board through the terminals 22 and signal leads 26, whereas the die is connected to ground through the thermal conductor leads 30, thermal conductor 20 and thermal conductor mounting 56. The entire structure is quite thin. Typically, the entire structure is less than about 0.8 mm thick and more preferably less than 0.6 mm thick. In one example, the dielectric layer of the chip carrier is about 25–75 $\mu$m thick, and most desirably about 50 $\mu$m thick. The terminals, leads and thermal conductor are about 10–25 $\mu$m thick, and desirably about 18 $\mu$m thick, whereas the solder lands used to connect the structure to the circuit board are about 25–50 $\mu$m thick. In this embodiment, the encapsulant layer between the front face of the chip and the inner surface of the chip carrier is about 50–75 $\mu$m thick. The front face of the chip lies about 180 $\mu$m above the face of the circuit board when the assembly is mounted on the circuit board. These thicknesses are merely illustrative.

The thermal conductor 20 and the metallic bond between the thermal conductor and the thermal conductor mounting of the circuit board provide a thermally conductive heat transfer path from the die into the circuit board and also provide electrical shielding between the die and the circuit board. The entire structure is rugged and reliable. Inter alia, the bond between the thermal conductor and the thermal conductor mounting mechanically secures the packaged chip in place. The packaged semiconductor chip of FIGS. 1 and 2 may include inductors formed as discussed below as, for example, inductors formed in whole or in part by elements of the chip carrier.

A different packaged semiconductor module (FIG. 3) includes a first semiconductor chip 614 incorporating active semiconductor components. As used in this disclosure, the term "active semiconductor component" should be understood as referring to components such as transistors having a switching, amplification, photoelectric, light-emitting or other function different from resistance, capacitance and inductance. Most common semiconductor chips such as processors and memory chips incorporate thousand or millions of active components. Moreover, analog or mixed digital/analog chips such as radio frequency amplifiers also incorporate active components. Section 602 also includes a second chip 615 which incorporates at least some passive components and which preferably incorporates only passive components. As used in this disclosure, the term "passive component" should be understood as referring to resistors, inductors and capacitors. Also, the second chip 615 may or may not include semiconductor material. As used in this disclosure, the term "chip" should be understood as referring to an element which includes active components or which includes thin-film components, i.e., components having thicknesses less than about 4 $\mu$m, or both. Thus, the term "chip" as used in this disclosure includes common semiconductor chips and also includes components which consist of one or more thin-film components formed on dielectric materials such as glass or on semiconductors materials such as silicon. Chips 614 and 615 are arranged to cooperate with one another and cooperatively form a first microelectronic assemblage 602. The module also includes a second microelectronic assemblage 604 incorporating an active semiconductor chip 606 and a passive semiconductor chip 608. A chip carrier 616 is also provided. The chip carrier is generally similar to the carriers discussed above. Here again, it includes a dielectric layer 618 and has a top or upper surface 638 and a lower or bottom surface 642. The chip carrier has a first set of terminals 622 disposed in a first region 631 of the carrier and a second set of terminals 623 disposed in a second region 633. The chip carrier also has a first thermal conductor 620 in the first region 631 of the carrier and a second thermal conductor 621 in the second region 633. These elements of the chip carrier may be similar to the corresponding elements of the chip carriers discussed above. The chip carrier is provided with a first set of interconnecting conductive elements 660 in the first region. Each such interconnecting elements 660 includes a first lead 660a, a trace 660b and a second lead 660c at the opposite end of the trace. The second region is provided with a similar set of interconnecting elements 661. Additionally, the chip carrier has a central ground strip 662 which extends into and out of the plane of the drawing in FIG. 3. Ground strip 662 defines the border between the first region 631 (to the left in FIG. 3) and the second region 633 (to the right in FIG. 3).

The first electronic assemblage 602 overlies the top surface 638 of the chip carrier in the first region. The first or active chip 614 is connected by terminal lead 626 to the terminals 622 of the first set, and is also in thermal communication with the first thermal conductor 620. The relationship between the first chip 614 and the first terminals 622 and first thermal conductor 620 may be similar to those discussed above. For example, an encapsulant 641 having a relatively high thermal conductivity may be used to provide intimate thermal communication between the front or contact-bearing surface of first chip 614 (the surface facing downwardly in FIG. 3) and the first thermal conductor 620. The second or passive chip 615 of first assemblage 602 is connected by the first conductive elements 660 to the first chip 614. Thus, leads 660a are bonded to contact (not shown) on first chip 614, whereas leads 660c of the same conductive elements are bonded to contacts on the second or passive chip 615. Also, the second or passive chip 615 of assemblage 602 is connected by leads 664 to the central ground region 662.

Chips 606 and 608, constituting second assemblage 604 are mounted in essentially the same way and overlie the second region 633 of the chip carrier.

Figure 3:
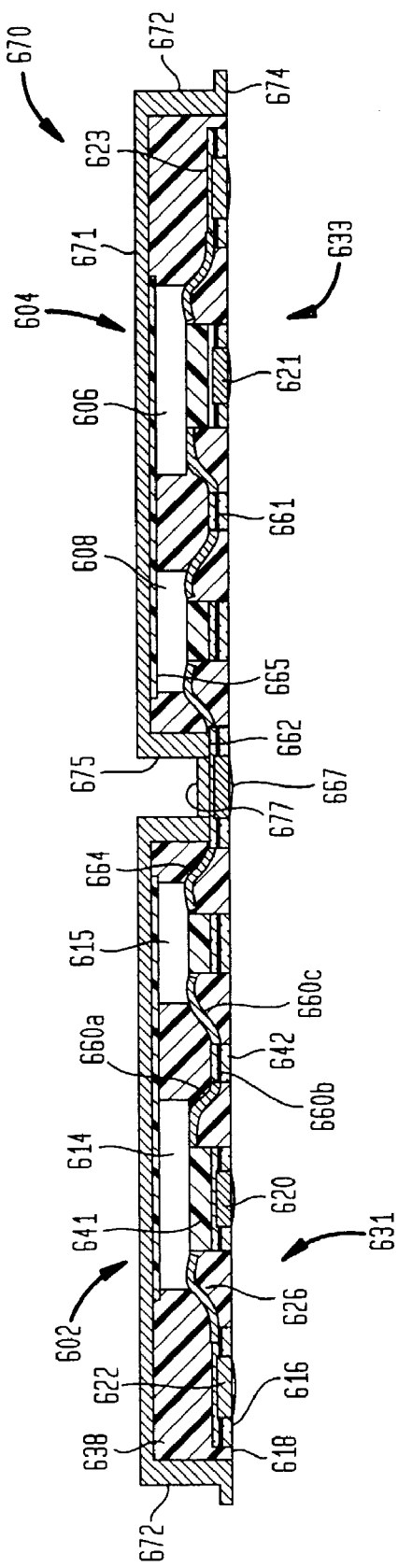
FIG. 3 is a diagrammatic sectional view of a module in accordance with yet another embodiment of the invention.

The module according to FIG. 3 also includes an enclosure 670. The enclosure includes a top wall structure 671 extending above the chips of both assemblies and side wall structure 672 extending downwardly from the top wall structure to the vicinity of chip carrier 618. Here again, the rear surfaces of the various dies desirably are in thermal communication with the top wall structure 671. For example, a layer of an encapsulant die attach or solder having relatively high thermal conductivity may be provided between the rear surfaces of chips 606, 608, 614 and 615 and the top wall structure 671. In this embodiment as well, the bottom edge of the side wall structure is adapted for connection to a circuit panel. Thus, the bottom edge is provided with a flange 674 arranged for solder bonding or other metallurgical bonding to a corresponding structure on a circuit panel. In this embodiment, however, the enclosure also includes a medial wall structure 675 extending downwardly from the top wall structure 671. The medial wall structure 675 terminates in a plate 677. Plate 677 is metallurgically bonded to the central ground strip 662 and, thus, is both electrically and mechanically connected to the central ground strip 662. The central ground strip 662 desirably is bonded to the mating element of the circuit panel when the module is mounted to the circuit panel, as by one or more solder masses 667.

The enclosure 671 provides mechanical protection and reinforcement to the packaged module. Moreover, the enclosure cooperates with thermal conductors 620, 621 and other metallic components of the chip carrier to provide electromagnetic shielding for the components in both assemblages 602 and 604. Additionally, the medial wall structure 675, in cooperation with central ground strip 662, provides effective electromagnetic shielding between the two assemblages. Thus, assemblage 602 is effectively isolated from assemblage 604. This arrangement can be used to provide such isolation for any type of electronic circuits. It is especially useful in the case where multiple electronic assemblages must be provided in a compact unit. Merely by way of example, modules according to this aspect of the invention can be used in elements of RF transmitting and receiving circuits of cellular telephones. In such a dual-band radio frequency power amplifier, one assemblage 602 provides a radio frequency power amplifier operating in a first frequency band, whereas another assemblage 604 provides a radio frequency power amplifier operating in another frequency band. Both assemblages can operate independently, without cross-talk or interference, even though the components of both assemblages tend to emit substantial amounts of electromagnetic interference. In a variant of the structure shown in FIG. 3, each assemblage may be a unit which includes only one chip; similar advantages of electromagnetic isolation between units will be provided.

However, in the case where each unit includes passive components in addition to the active chip, fabrication of at least some of the passive components in each assemblage in an integrated chip, such as passive chips 615 and 608, makes the module considerably more compact than it would be if the passive components were provided as separate, discrete elements. Resistors and capacitors, in particular, can be fabricated readily in a chip. The materials and processing techniques to make the passive chips 608 and 615 may be different from those used to make the active chips 606 and 614. For example, the passive chips may be formed on materials such as glass rather than on silicon. In another example, the active chips may be formed in whole or in part from compound semiconductors such as III–V semiconductors or II–VI semiconductors, whereas the passive chips may be silicon-based chips. Thus, RF power amplifier chips formed from gallium arsenide and related semiconductors can be used in conjunction with silicon-based passive chips. In another example, the second or passive chips can be made with a larger minimum feature size or "line width" than the active chips, or vice-versa. Additionally, active chips originally made for use with discrete external passive components can be used in conjunction with the passive chips. Thus, compactness similar to that achievable by incorporating the passive components in the active chip itself can be achieved without the expense and difficulty of modifying the active chip itself. As further discussed below, a module of the type shown in FIG. 3 may also include inductors formed in whole or in part in the chip carrier.

Figure 4:
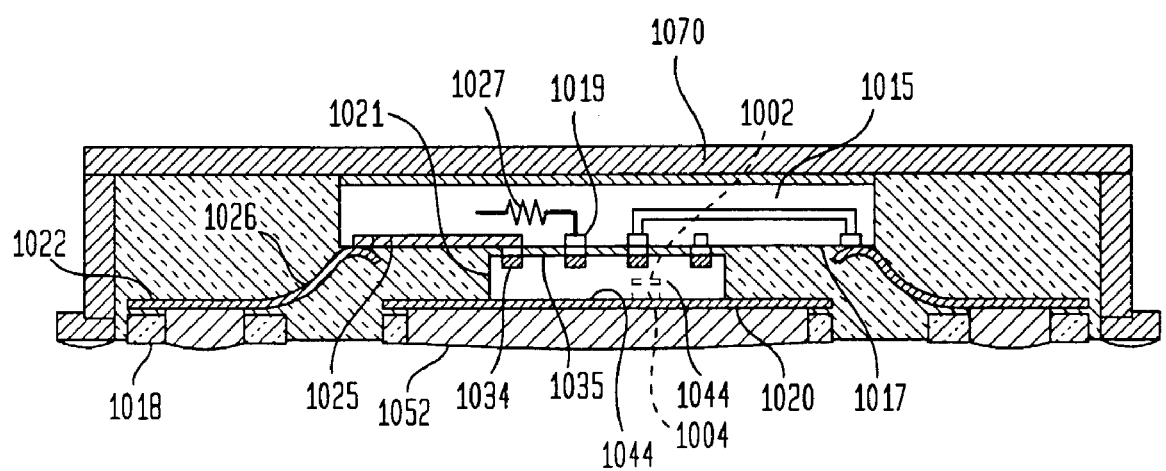
FIGS. 4 and 5 are diagrammatic sectional views of packaged chips according to still further embodiments of the invention.

A packaged chip assembly according to yet another configuration (FIG. 4) incorporates a chip carrier 1018 similar to the chip carriers discussed above and also has an enclosure 1070 similar to those discussed above. First or active chip 1014 is mounted on the thermal conductor 1020 of the chip carrier, with the front or contact-bearing surface 1035 of the active chip facing upwardly, away from the chip carrier and thermal conductor, and with the rear surface 1044 of the active chip facing downwardly, toward the thermal conductor. A passive or second chip 1015 is mounted over the active chip 1014 so that the contact-bearing surface 1017 of this chip confronts the contact-bearing surface 1035 of the active chip. Contacts 1019 of the passive chip 1015 are bonded to contacts 1034 of the active chip as, for example, by small solder bonds, diffusion bonding or other metallurgical bonding technique. Alternatively, other interconnection techniques such as a silver-filled epoxy or other metal and polymer composite, or a layer of anisotropic conductive material may be provided between these chips so as to interconnect mutually facing contacts on the two chips. A composite material of the type sold under the trademark ORMET may be employed. Such a material includes a dielectric such as an epoxy, metal particles and a solder, and cures to form continuous conductors formed from the metal particles and solder extending through the dielectric.

The second or passive chip projects outwardly in horizontal directions generally parallel to the plane of chip carrier 1018 beyond the edges 1021 of the active chip. The passive chip has outer contacts 1023 disposed beyond the edges of the active chip, and has conductors 1025 connected to these outer contacts. Conductors 1025 may connect directly with contacts 1019 and, hence, directly with contacts 1035 of the active chip. The passive chip also incorporates passive components, desirably resistors and capacitors, symbolized by a resistor 1027. As will be appreciated, a number of passive components may be incorporated within the passive chip. Also, some or all of the outer contacts 1023 of the passive chip may be connected to or through such passive components. If the package includes additional discrete components (not shown) or additional chips (not shown), the connections between outer contacts 1023 and inner contacts 1019 may include these elements.

The front, contact-bearing surface 1017 of the passive chip faces downwardly, toward the chip carrier or substrate 108. Thus, the outer contacts 1023 of the passive chip may be readily connected to the terminals 1022 of the chip carrier by leads 1026 similar to those discussed above. Moreover, because the rear surface 1044 of the active chip confronts the thermal conductor 1020, the rear surface of the active chip may be closely coupled to the thermal conductor so as to provide excellent heat transfer from the active chip to the thermal conductor and through the thermal conductor to the circuit panel. For example, the rear surface of the active chip may be coupled by a layer of solder or other metallic bonding material to the thermal conductor. The rear surface 1044 of the active die may be provided with recesses 1004 and rear surface contacts 1002. Here again, the rear surface contacts may serve as ground or power connections to the active die, and provide additional thermal conductivity 1020. As discussed above, the thermal conductor itself desirably is coupled to the thermal conductor mounting pad of the circuit panel by a large mass of solder or other metallic bonding material 1052. Additionally, the passive chip is coupled to enclosure 1070, as by a thin layer of die-bonding material or encapsulant having high heat conductivity, so that both the passive chip and the active chip can be cooled by heat transfer to enclosure 1070. Here again, inductors can be provided in as discussed below in the chip carrier itself or by structures, including portions formed in the chip carrier and portions extending between the chip carrier and the passive chip.

An assembly according to yet another configuration (FIG. 5) includes an active chip 1114 and a passive chip 1115 as discussed above with reference to FIG. 4. In this embodiment, however, the orientation of the chips is reversed. Thus, active chip 1114 is mounted above the passive chip 1115, and the front or contact-bearing surface 1135 of the active chip faces downwardly, toward the chip carrier 1118. The front surface 1117 of the passive chip 1115 faces upwardly, away from the chip carrier. The outer contacts 1123 of the passive chip are connected by leads in the form of wire bonds to terminals 1122 on the chip carrier. The rear surface of the active chip is in thermal communication with the top wall structure 1171 of the spreader or enclosure 1170, whereas the rear surface of the passive chip is in thermal communication with a thermal conductor 1120, which is bonded to a mating metallic element 1152 on the circuit board 1112 when the assembly is mounted on a circuit board. Thus, the passive chip 1115 and thermal conductor provide a thermal path between the active chip and the circuit board when the module is mounted to the circuit board. Moreover, the spreader or enclosure 1170 provides further thermal dissipation from the active chip to the surroundings.

Figure 5:
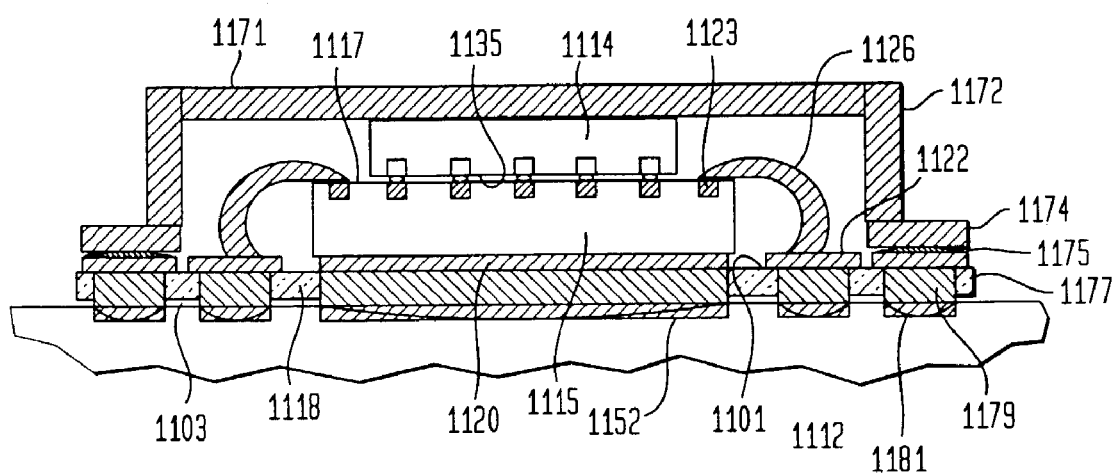

In the embodiment of FIG. 5, the side wall structure 1172 of the enclosure terminates just above the top or inner surface of chip carrier 1118. A flange 1174 at the bottom of the side wall structure is bonded to a metallic rim structure 1177 on the chip carrier, as by a solder or other metallic bonding material 1175 during manufacture of the module. Rim structure 1177 may be in the form of a continuous ring or a series of pads extending around the periphery of the chip carrier. The rim structure is exposed at the bottom or outer surface of the chip carrier, as by an opening or series of openings 1179 extending through the chip carrier. When the module is mounted to circuit board 1112, the rim structure is bonded to a mating element or set of elements 1181 on the circuit board, to provide a good heat dissipation path between enclosure 1170 and the board. This connection, as well as the connection of the thermal conductor 1120 to the board, can be accomplished in the same surface mounting operation used to connect terminals 1122 to the mating contacts on the circuit board. Moreover, element 1181 can be provide a ground connection to the enclosure. The embodiment of FIG. 5 uses a "circuits-in" configuration, with the metallic features of the chip carrier disposed on the inner or upper surface 1101. Similar structures can be provided in a "circuits-out" arrangement, with the metallic features on the lower or bottom surface 1103. In a further variant, the passive chip 1115 may have a conductive rear surface forming a common connection such as a ground or power connection, or may be provided with ground or power contacts (not shown) at discrete locations on the rear surface or in recesses open to the rear surface, similar to the rear surface contacts discussed above with reference to FIG. 4.

Most preferably, at least some of the inductors for use in above-described circuits of FIGS. 1–5 are formed at least in part by the chip carrier or by the chip carrier in conjunction with leads and other structures extending to one or both of the chips. Although inductors can be fabricated in a passive or active chip, it is difficult to make inductors with high inductance and, particularly, with a high quality of factor or Q. The chip carrier typically is a "thick-film" structure, having metal layers more than about 2 $\mu$m thick, typically more than about 4 $\mu$m thick, and most preferably more than about 10 $\mu$m thick. Such thick layers commonly are formed by processes such as lamination of metal layers to a dielectric, plating or screen printing. Inductors formed at least in part in the chip carrier can employ large, thick, low-resistance conductors and can provide high inductance values with resistance far lower than that achievable in a thin film structure. Thus, it is desirable to provide at least some of the inductors incorporated in the circuit as structures defined in part or in whole by elements of the chip carrier, by leads extending between the chip carrier and a chip or both.

Figure 6:
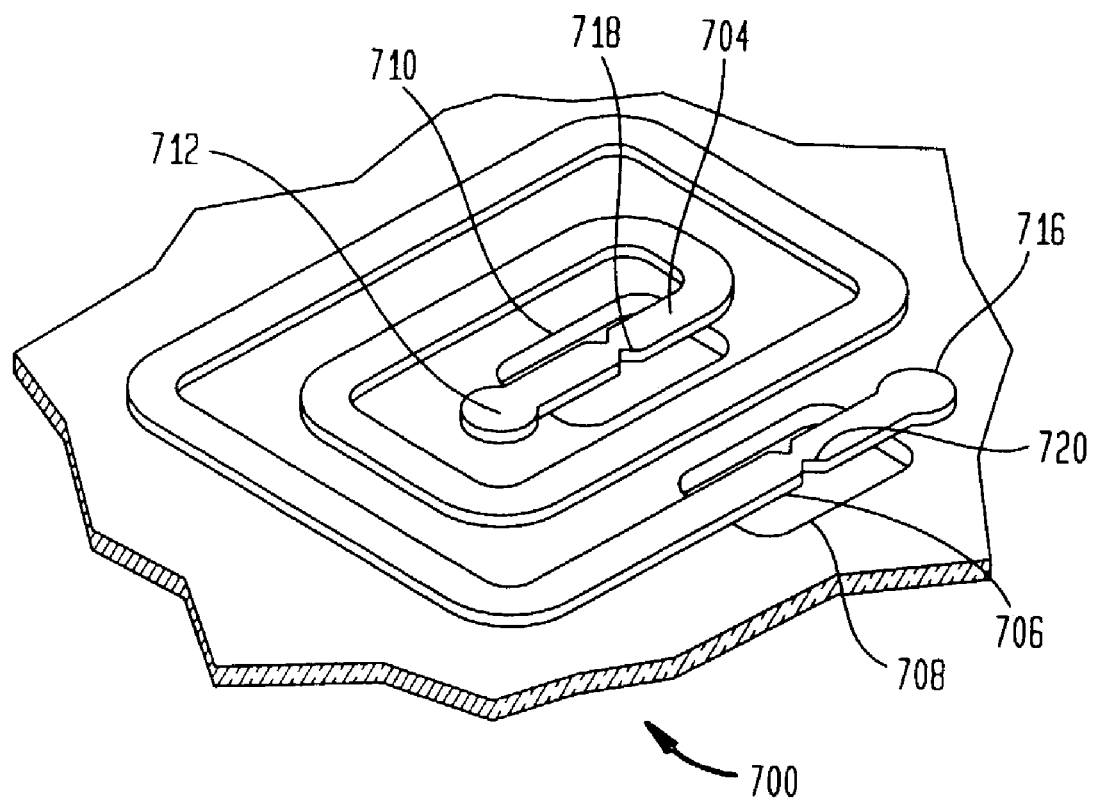
FIG. 6 is a fragmentary, diagrammatic perspective view of a component in accordance with a further embodiment of the invention prior to connection to a chip.
Figure 7:
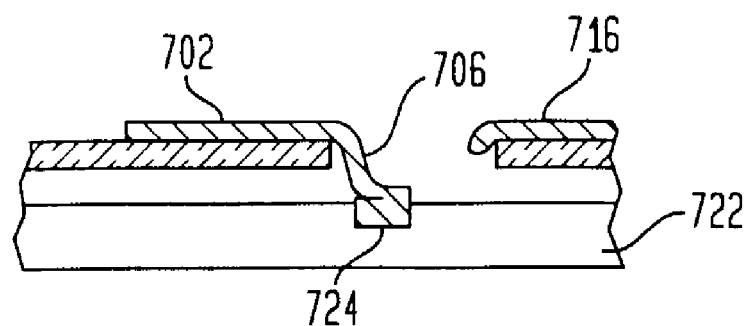
FIG. 7 is a fragmentary, diagrammatic sectional view of a packaged chip incorporating the component of FIG. 6.

As depicted in FIGS. 6 and 7, a substrate such as a chip carrier or other connection component used in conjunction with a semiconductor chip may include a dielectric layer 700 having a trace 702 extending generally in a spiral pattern on the dielectric layer. Trace 702 has leads 704 and 706 formed integrally with the trace. Thus, the trace and leads may be formed on a surface of the dielectric layer by a deposition process or by selective etching of a metallic layer overlying the dielectric layer. The connection component, and hence dielectric layer 700, is provided with openings or bond windows 708 and 710 aligned with leads 704 and 706. As fabricated, the leads 704 and 706 may be provided with anchors 712 and 716. As discussed above in connection with the terminal leads and thermal conductor leads, leads 704 and 706 may be connected to their respective anchors by frangible sections 718 and 720, respectively, when the connection component is manufactured. When the connection component or chip carrier is assembled with a chip 722, the spiral trace 702 overlies the front surface of the chip. Leads 704 and 706 are connected to contacts 724 on the chip and disconnected from their respective anchors, as seen in FIG. 7. The process used for connecting these leads may be identical to the process used for connecting the other leads such as the thermal conductor leads and ground leads discussed above. This is particularly desirable, inasmuch as it avoids the need for separate processing steps and separate equipment.

Figure 8:
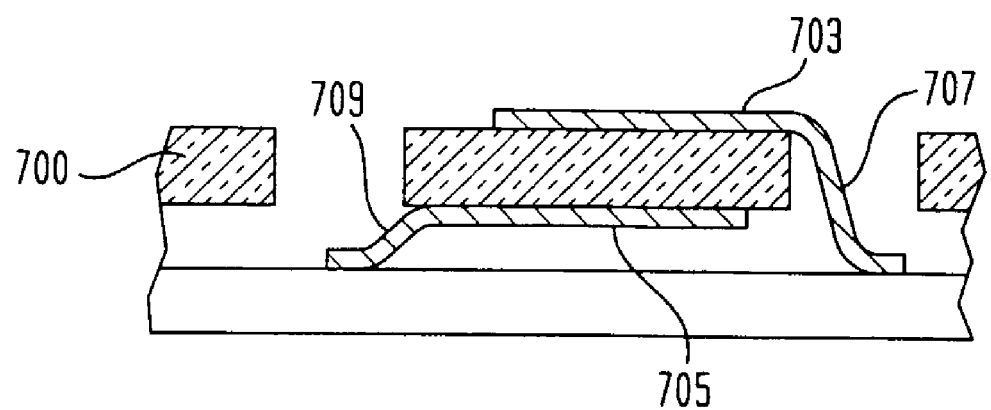
FIG. 8 is a fragmentary, diagrammatic sectional view of a packaged chip according to a further embodiment of the invention.
Figure 9:
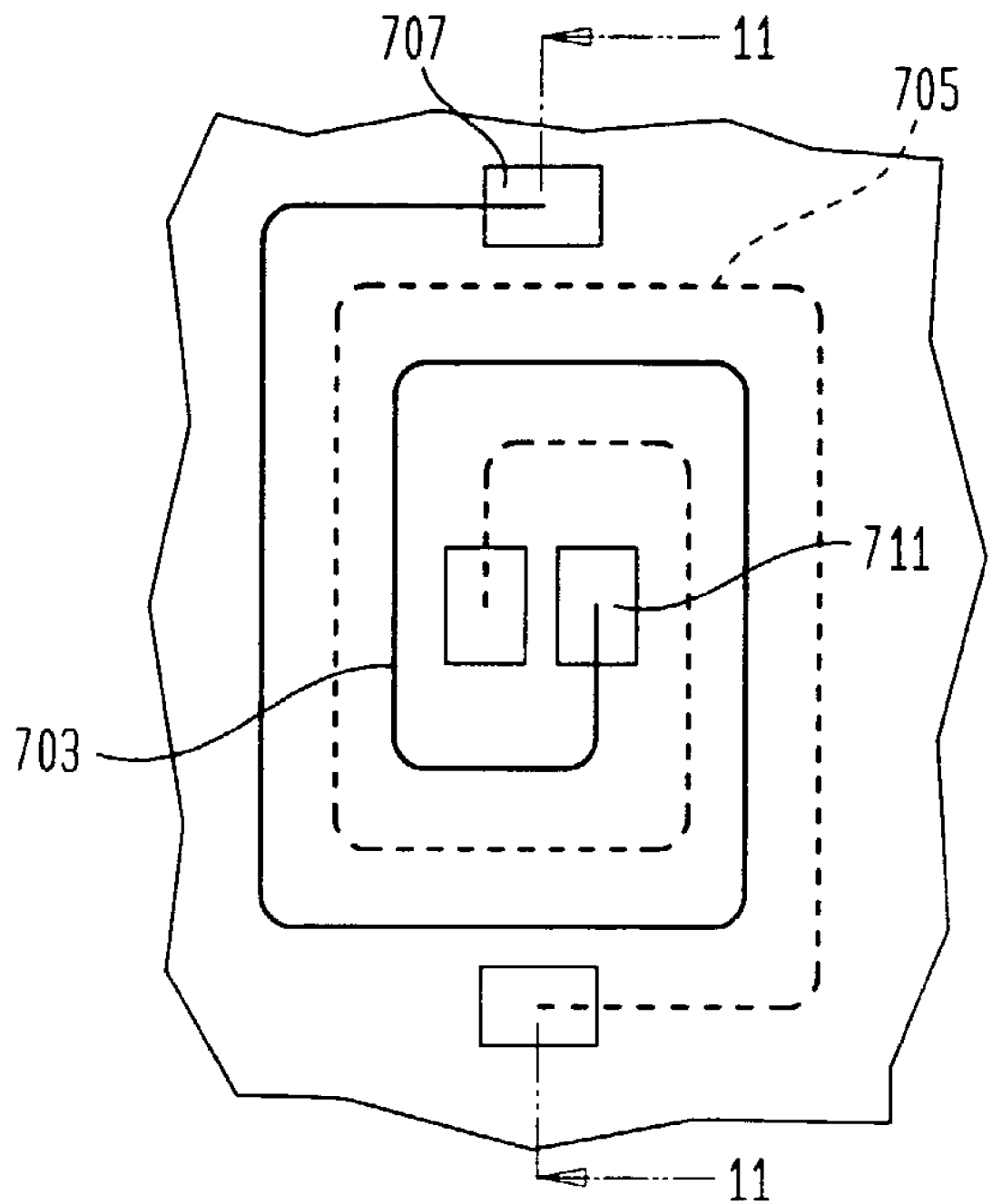
FIG. 9 is a fragmentary, diagrammatic plan view of a component incorporated in the packaged chip of FIG. 8.

As schematically illustrated in FIG. 8, a similar inductor can be made with two spiral coils 703 and 705 overlapping one another on opposite sides of the dielectric layer. Here again, these coils may be connected to a chip by leads 707 and 709, formed integrally with the coils themselves. Such an arrangement can be used to provide a high-value inductor or a transformer. As best seen in FIG. 9, the lead 711 at the inside of spiral coil 703 (on the outer surface of the dielectric layer) may be disposed inside of one or more turns of the spiral coil 705 on the inner surface of the dielectric layer. In this case, the inside lead 711 may extend to the chip through a bond window in the dielectric layer inside of or between turns of the other coil 705.

Figure 10:
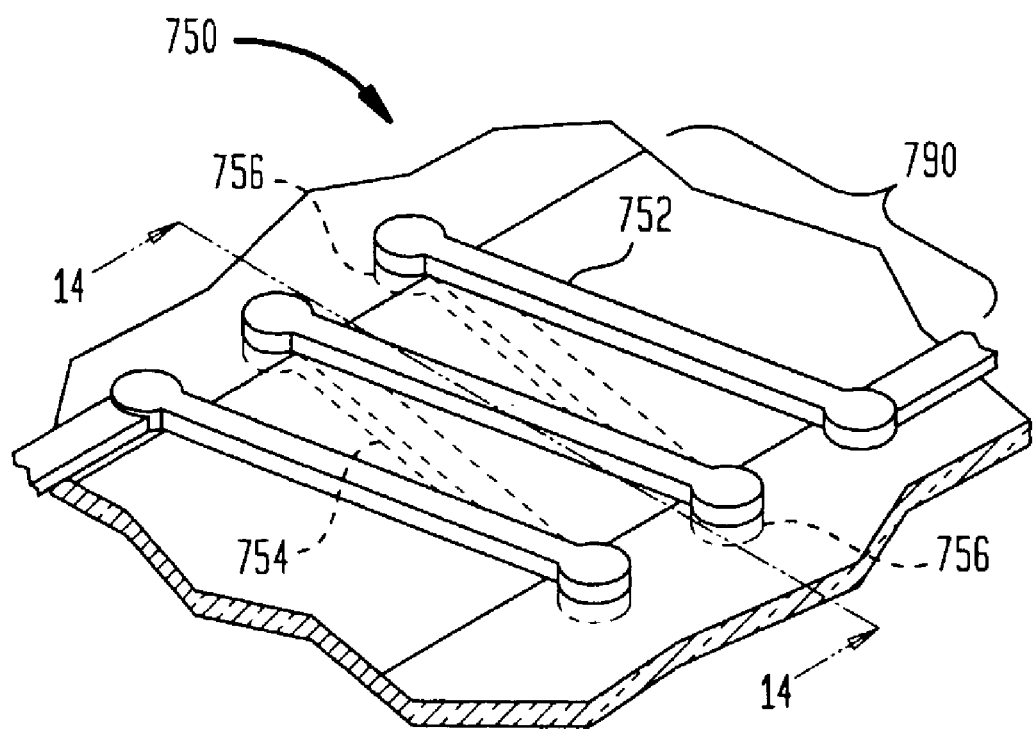
FIG. 10 is a fragmentary, diagrammatic perspective view of a component in accordance with yet another embodiment of the invention.

As shown in FIG. 10, an inductor can be formed on a connection component or chip carrier 750 having a planar or sheet-like structure including one or more dielectric layers by a zigzag arrangement of conductors 752 on a first side and conductors 754 on the opposite side of the structure. These conductors are electrically connected in series by via conductors 756 extending through the structure 750, so as to form a solenoid in the form of a flattened helix. Each turn of the helix is constituted by a first conductor 752, a via conductor 756, a second conductor 754 and another via conductor 756 at the opposite end of such second conductor, which in turn connects to a first conductor 752 constituting part of the next turn.

Figure 11:
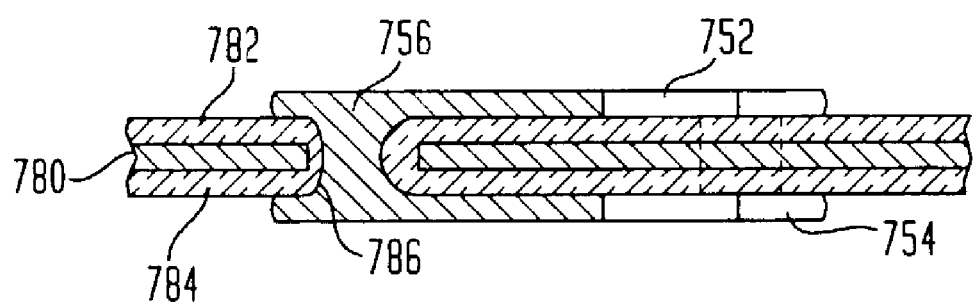
FIG. 11 is a diagrammatic sectional view taken along line 14—14 in FIG. 10.

As best seen in FIG. 11, the generally planar or sheet-like structure 750 may include an internal metallic layer 780, a first dielectric layer 782 on one side of the metallic layer and a second dielectric layer 784 on the opposite side of the metallic layer. The dielectric layers may be formed, for example, by coating a dielectric material onto the metallic layer. For example, the dielectric layers 782 and 784 may be formed by electrophoretic deposition on the metallic layer. These dielectric layers may be continuous with a dielectric coating 786 extending through holes in the metallic layer. One particularly desirable process for forming such a structure is disclosed in co-pending, commonly-assigned U.S. patent application Ser. No. 09/119,079, filed Jul. 10, 1998, the disclosure of which is hereby incorporated by reference herein. As best appreciated with reference to FIG. 11, the turns of the helical inductor will encompass a section 790 of the metallic layer. That section 790 may be formed from a ferromagnetic material. The remaining sections of the metallic layer may be formed from a non-ferromagnetic material. Alternatively, the metallic layer may be omitted entirely. In an alternative arrangement, the ferromagnetic core of the inductor may be provided as a discrete ferromagnetic element which is not part of a larger metallic layer. Such a discrete ferromagnetic element may be embedded within the dielectric structure.

Figure 12:
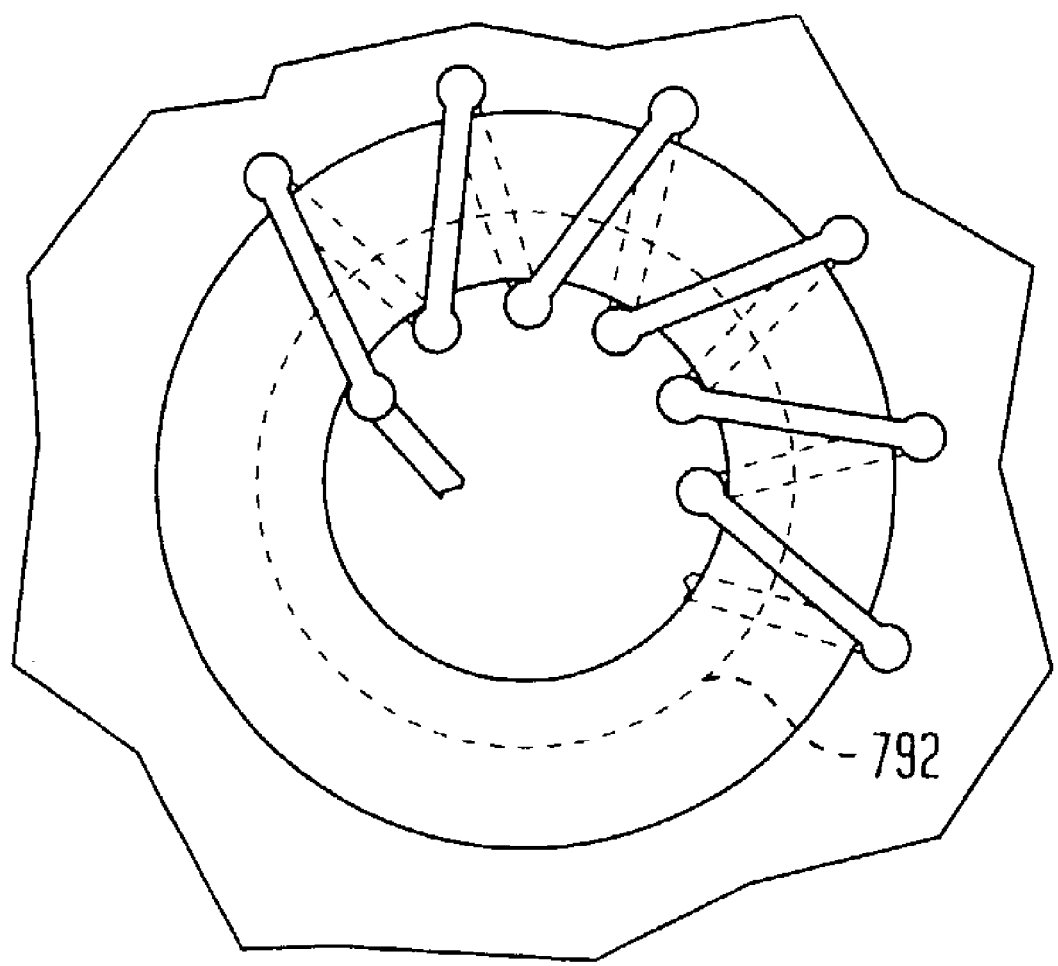
FIG. 12 is a fragmentary, diagrammatic plan view of a component in accordance with yet another embodiment of the invention.

In the embodiment depicted in FIG. 10, the solenoid extends along a straight path. As depicted in FIG. 12, a similar solenoid may be provided in a curved or toroidal structure extending along all or part of a loop-like path 792.

Figure 13:
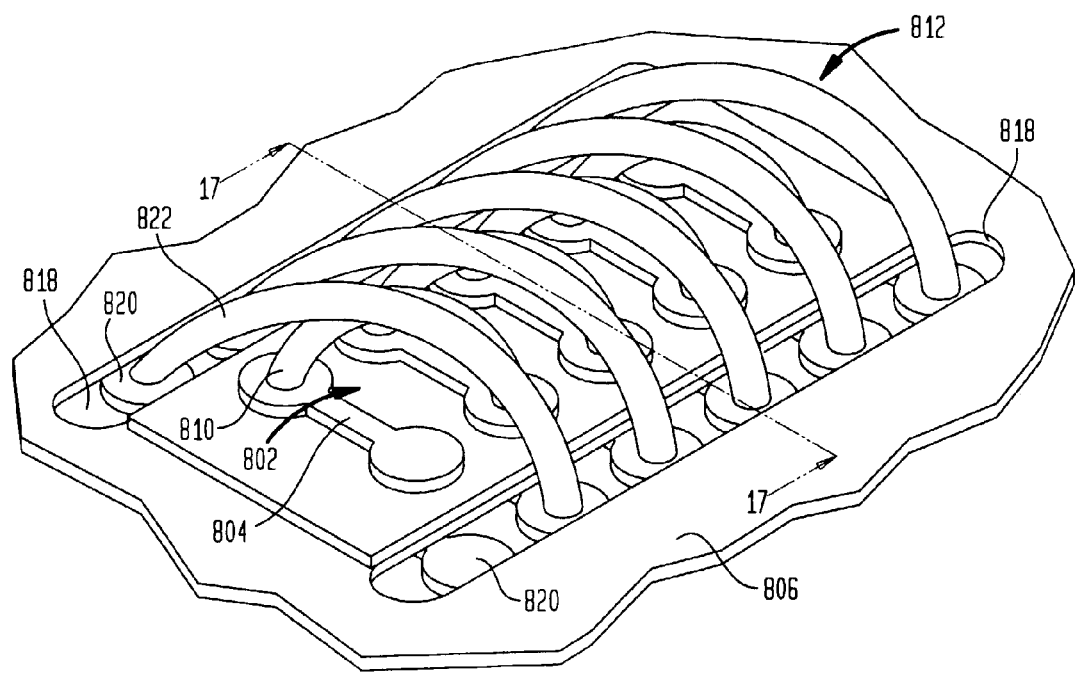
FIG. 13 is a fragmentary perspective view of a component according to yet another embodiment of the invention.
Figure 14:
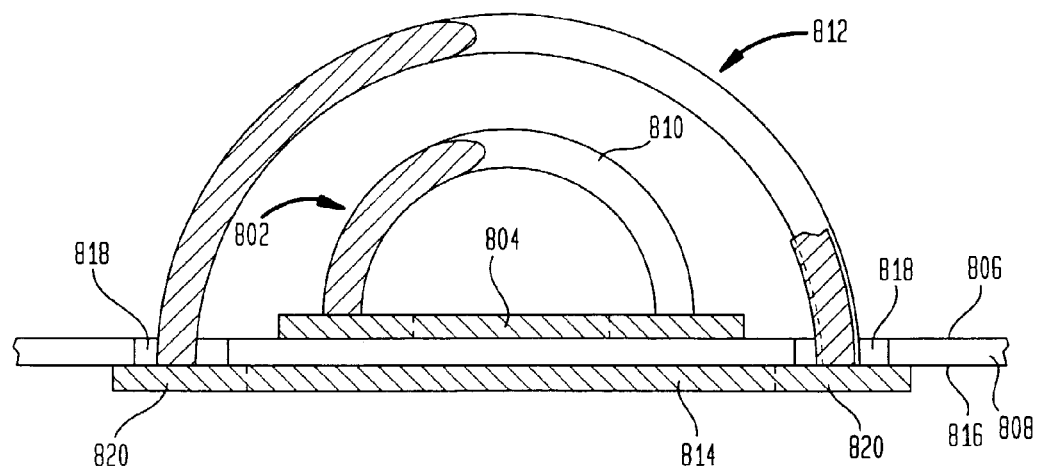
FIG. 14 is a fragmentary sectional view taken along line 17—17 in FIG. 13.

An inductor according to a further embodiment of the invention (FIGS. 13 and 14) includes a first or interior solenoid 802 formed by first side conductors 804 on a first side 806 of a substrate 808 incorporating a dielectric layer and by first loop conductors in the form of wire bonds 810 connected between conductors 804. The first loop conductors or wire bonds 810 project upwardly from the first surface 806 of substrate 808. Each such first loop conductor or wire bond extends from an end of one first side conductor 804 to the opposite end of another first side conductor 804. Each turn of interior solenoid 802 includes one first side conductor 804 and one first loop conductor or wire bond 810. A second or outer solenoid 812 is formed by second side conductors 814 on the second, opposite side 816 of the substrate 808. Bond windows 818 are provided in alignment with pads 820 at the ends of the second side conductors. Second loop conductors or wire bonds 822 extend from pads 820 through the bond windows 818 to the first surface and extend upwardly away from the first surface 806 of the substrate. The second loop conductors or wire bonds 822 and second side conductors 814 are connected in series with one another to form the outer solenoid 812. Each turn of the outer solenoid includes one second conductor 814 and one second loop conductor or wire bond 822. The inner and outer solenoids are concentric with one another. Inner solenoid 802 is surrounded by outer solenoid 812. A structure as depicted in FIGS. 13 and 14 may be used to provide a highvalue inductor (where the inner and outer solenoids are electrically connected in series) or a transformer (where the inner and outer solenoids are not electrically connected to one another). This structure also can be made in a toroidal configuration.

Figure 15:
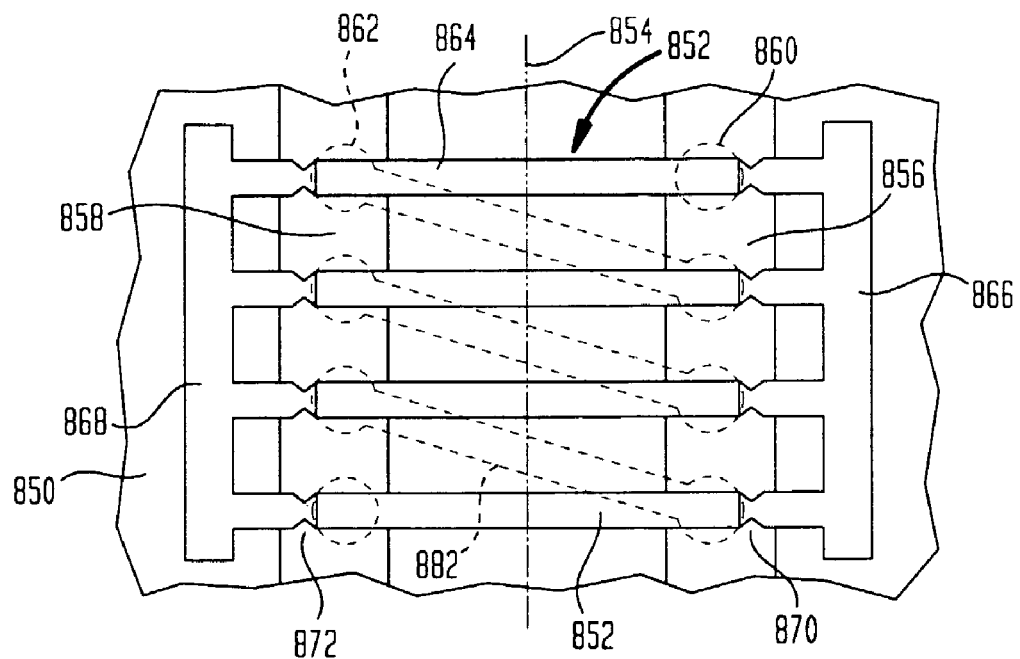
FIG. 15 is a fragmentary plan view of a packaged chip according to yet another embodiment of the invention.

A component usable in a further embodiment of the invention is depicted in fragmentary view in FIG. 15. The component according to this embodiment includes a substrate 850 incorporating a dielectric layer. The substrate desirably is generally planar or sheet-like. A plurality of conductive elements 852 are arrayed along a path 854. The substrate has bond windows 856 and 858 disposed on opposite sides of path 854. Each conductive element includes a first lead portion 860 aligned with bond window 856 on one side of the path, a second lead portion 862 aligned with the bond window 858 on the opposite side of path 854 and a trace portion 864 extending along the substrate between the lead portions. The ends of the lead portions remote from path 854 and remote from the trace portions 864 optionally may be connected to anchors 866, 868 by frangible portions 870, 872 as depicted in FIG. 15.

Figure 16:
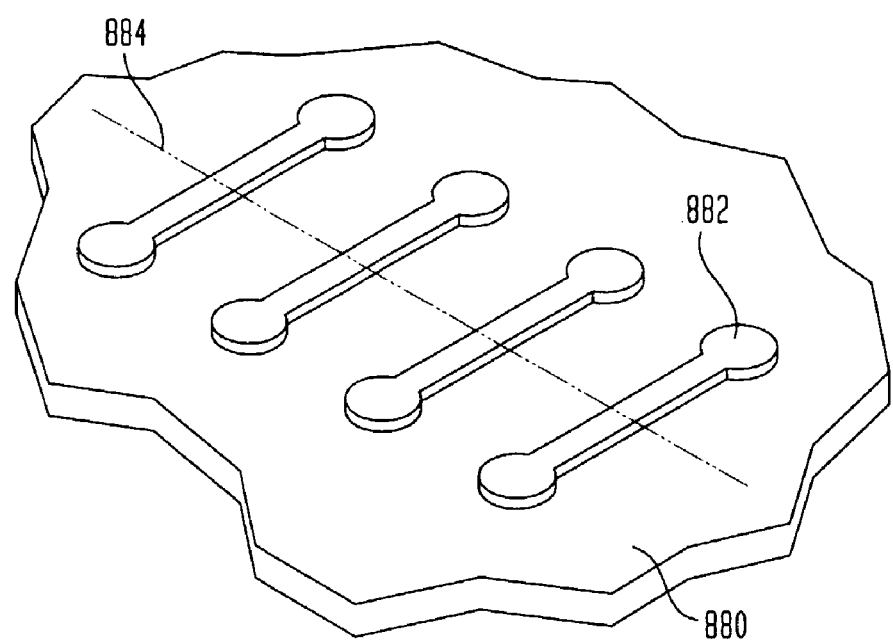
FIG. 16 is a fragmentary perspective view showing a portion of the chip incorporated in FIG. 15.
Figure 17:
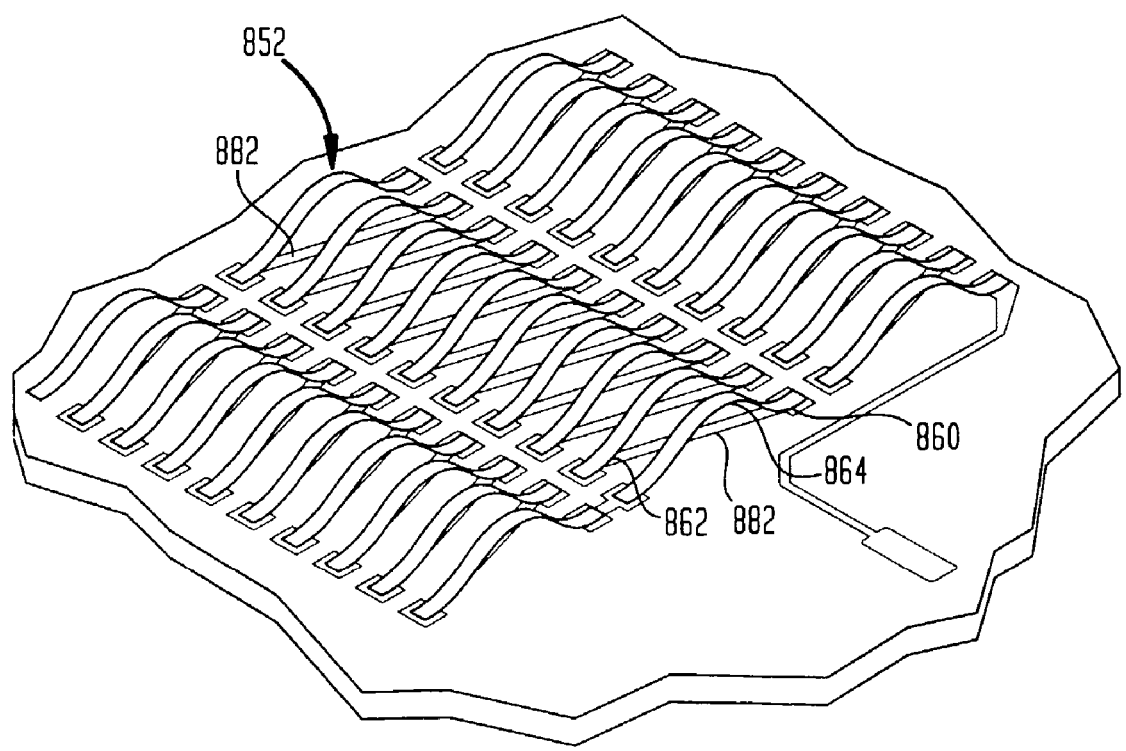
FIG. 17 is fragmentary, diagrammatic perspective view depicting certain elements in the packaged chip of FIGS. 15 and 16.

To form the inductor, the component is assembled with a chip, substrate or other element 880 (FIG. 16) having an array of conductors 882 arranged along a similar path 884. Conductors 882 are also elongated and extend generally transverse to path 884. Component 850 is juxtaposed with component 880 so that path 854 overlies path 884 and extends generally parallel thereto, and so that the bond windows 858 and 856 overlie the ends of conductors 882. The first lead portion of 860 of each conductive element on component 850 is bonded to one end of a conductor 882, whereas the second lead portion 862 is bonded to the opposite end of the next adjacent conductor 882 on the chip or other mating element 880. The connected conductive elements 852 and conductors 882 form a solenoid. Each turn of the solenoid includes a conductor 882 on element 880; a first lead portion projecting away from element 880 and towards the substrate 850; the trace portion 864 of the same conductive element and the second lead portion 862 extending downwardly toward 880, where it joins the conductor 882 constituting the next turn. Such an inductor can provide a relatively large cross-sectional area within each turn in a compact structure. Moreover, such an inductor can be formed by the same lead bonding techniques used to fabricate other connections in the packaged chip or module. A ferromagnetic core can be provided in such an inductor by providing a strip of ferromagnetic material in the substrate 850 or by mounting a strip of ferromagnetic material on the inner surface of substrate 850 (facing towards mating element 880) or on the surface of mating element 880. In a particularly preferred arrangement, such an inductor can be provided by providing the conductive elements 852 on the chip carrier and bonding the lead portions of the conductive elements to a passive chip or active chip, during fabrication of a packaged module. In this case, the conductors 882 can be thin-film components or, more preferably, can be thick-film elements applied on the surface of the chip. Turning briefly to FIG. 17, the latter depicts a fragmentary, diagrammatic perspective view depicting certain elements in the structure of FIGS. 15 and 16.

Figure 18:
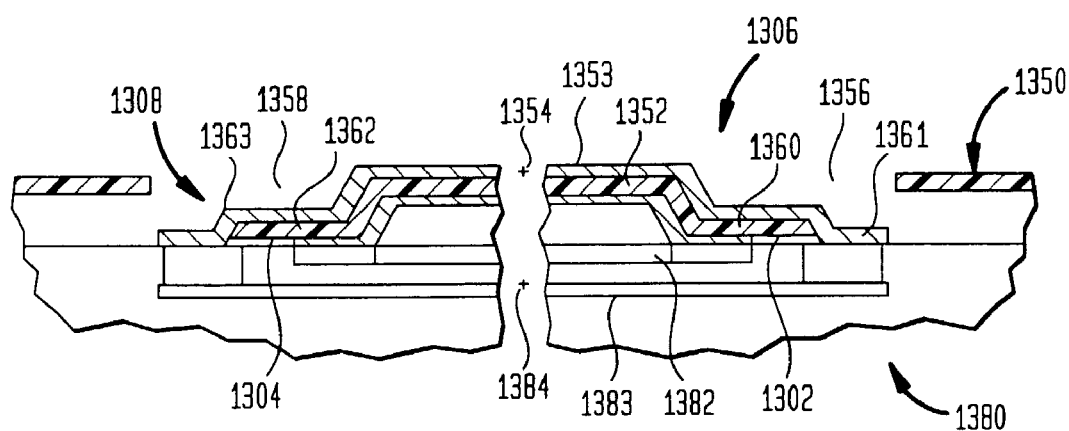
FIG. 18 is a diagrammatic sectional view of an assembly in accordance with yet another embodiment of the invention.

As illustrated in FIG. 18, the inductor-forming arrangement discussed above with reference to FIGS. 15–17 can be modified so as to form concentric inductors. As in the embodiment of FIG. 15, the component includes a substrate 1350 incorporating a planar or sheetlike element. Here again, the substrate may be the chip carrier used in a packaged semiconductor chip or module. A first set of conductive elements 1352 is arrayed along a path 1354 similar to the path 854 discussed above with reference to FIG. 15. Path 1354 extends into and out of the plane of the drawing in FIG. 18. Here again, each first set conductive element 1352 includes a first lead portion 1360 aligned with a bond window 1356 on one side of the path and a second lead portion 1362 disposed on the opposite side of path 1354 and aligned with a second bond window 1358 in the substrate, and a trace portion connecting the first and second lead portions 1360 and 1362. The component also includes a second set of conductive elements 1353 disposed on the opposite side of substrate 1350, i.e., on the upwardly-facing side in FIG. 18. Each such second-set conductive element also includes a trace portion, a first lead portion 1361 aligned with the first bond window 1356 on one side of the path and a second lead portion 1363 aligned with the second bond window 1358 on the opposite side of the path. In the embodiment illustrated, the first and second sets of conductive elements are aligned with one another, so that each first lead portion 1360 of the first set extends beneath a first lead portion 1361 of the second set and each second lead portion 1362 of the first set extends beneath a second lead portion 1363 of the second set. Each pair of first lead portions 1360 and 1361 is separated from one another by a strip 1302 of dielectric material formed integrally with substrate 1350 projecting partially across the bond window. The aligned first lead portions and strip 1302, thus, form a composite, multiconductor lead 1306. The structure of such multiconductor lead may be identical to the multiconductor lead structures described in U.S. Pat. Nos. 6,329,607 and 6,239,384, the disclosures of which are hereby incorporated by reference herein. Likewise, each pair of aligned second lead portions 1362 and 1363 is provided with a similar strip of dielectric material 1304 to form a further composite multiconductor lead 1308 on the opposite side of path 1354.

The mating element 1380 used with this component is provided with two arrays of conductors 1382 and 1383, each such array also being arrayed along a similar path 1384. The conductors 1382 of the first set desirably are electrically insulated from adjacent conductors 1383 of the second set. Here again, the conductors 1382 and 1383 are generally elongated and extend generally transverse to path 1384.

In a manner similar to the assembly operation discussed with reference to FIGS. 15–17, the component incorporating substrate 1350 is assembled to the mating element 1380 so that path 1354 overlies path 1384 and extends generally parallel thereto, and so that the bond windows 1356 and 1358 overlie the ends of the conductors 1382 and 1383.

As in the embodiment discussed above with reference to FIGS. 15–17, the first lead portion 1360 of each first-set conductive element on the component 1350 is aligned with one end of a conductor 1382 of the first set on component 1382, whereas the second lead portion 1362 is aligned with the opposite end of the next adjacent conductor 1382. Similarly, the first lead portion 1361 of each second-set conductive element is aligned with one end of a conductor 1383, whereas the second lead portion 1363 or each second-set conductive element is aligned with the opposite end of an adjacent conductor 1383. The aligned lead ends and conductor ends are bonded to one another. The procedures used for bonding ends of the multiconductor leads 1306 and 1308 can be as described in the aforementioned '607 and '384 patents. The resulting structure yields a pair of nested solenoids, one such solenoid being formed from the conductors 1382 of the first array and the conductive elements of the first set, the other such solenoid being formed from the conductors 1383 and the conductive elements of the second set.

In the embodiment discussed above with reference to FIG. 18, the number of second lead portions is equal to the number of first lead portions and, hence, the number of turns in each solenoid is the same. However, this is not essential. Thus, if some of the first lead portions are omitted or are not connected in the inner solenoid, the inner solenoid will have fewer turns than the outer solenoid. Likewise, if some of the second lead portions are omitted or not connected, the outer solenoid will have fewer turns.

Figure 19:
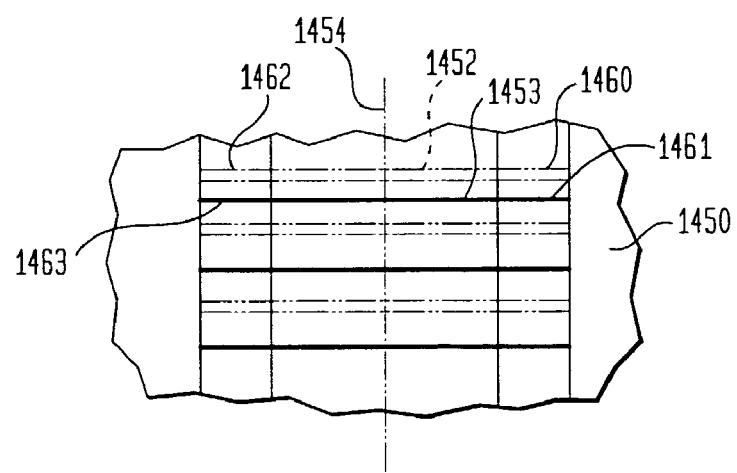
FIG. 19 is a diagrammatic top plan view of a component in accordance with a still further embodiment of the invention.

In a further variant (FIG. 19), the first-set conductive elements 1452 again extend on one surface of substrate 1450, whereas the second-set conductive elements 1453 extend on the opposite surface, but the lead portions of the first and second set are offset from one another in the direction along the length of the path 1454. Thus, first lead portions 1460 of the first set are interspersed in the lengthwise direction of the path with the first lead portions 1461 at one bond window, whereas the second lead portions 1462 of the first set are interspersed with the second lead portions 1463 of the second set at the opposite bond window. The various lead portions may be connected to a mating element such as a chip or other element similar to the element 1380 discussed above, having two separate sets of conductors. This arrangement will also provide concentric solenoids, one including the conductors of the first set and the other including the conductors of the second set. As in the other inductor embodiments discussed above, the paths 1354 (FIG. 18) and 1454 (FIG. 19) may be either straight or curved and may be close curves so as to form concentric toroidal solenoids.

In accordance with various aspects of the invention, further forms of inductive-type elements may be constructed as described further below. It should be noted that the following embodiments are, like the above-described embodiments, constructed using any of the earlier-described techniques, which, as such, will not be repeated below.

Figure 20:
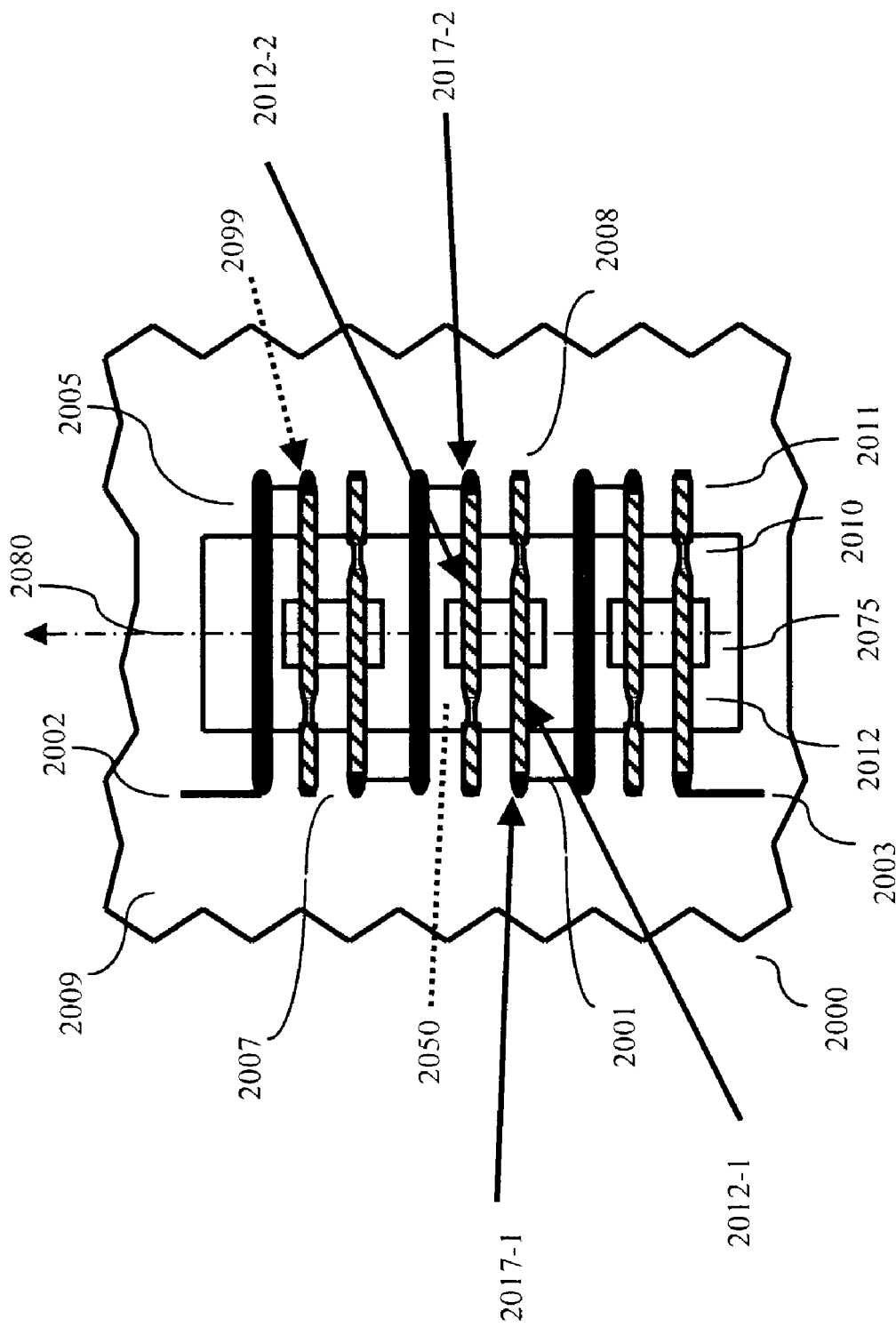
FIG. 20 is a fragmentary, plan view of a component in accordance with a further embodiment of the invention.
Figure 21:
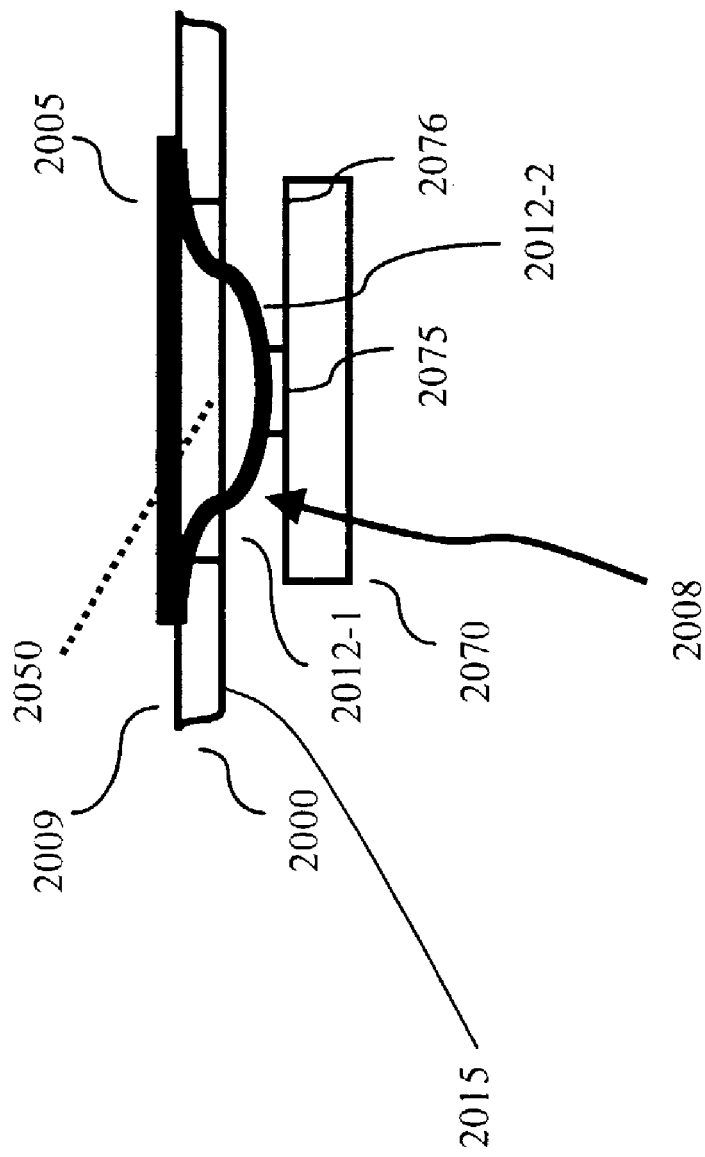
FIG. 21 is a fragmentary, diagrammatic sectional view of an assembly according to a further embodiment of the invention.

A component in accordance with a further embodiment of the invention, as shown in FIG. 20, includes a substrate incorporating a dielectric layer 2000. The substrate may be a chip carrier or other connection component used in a chip assembly, and may be a generally planar substrate such as a sheetlike dielectric tape or circuit board having a first surface 2009 and an oppositely-facing second surface 2015 (FIG. 21). As discussed above, component may include features such as terminals for mounting the chip assembly to a larger circuit board, thermal conductors and other features in addition to the inductor-forming features discussed below. Further, the component may also include traces 2003 and 2002 for coupling other elements of the assembly to the inductor which will be formed.

The substrate has one or more bond windows as illustrated by bond window 2050 extending along a path 2080. In the embodiment illustrated, the bond window is elongated and he path 2080 corresponds to a lengthwise direction of bond window 2050. The component includes an inductive element forming portion 2099. The inductive element forming portion includes a first set of conductive leads 2005 (solid-filled lines) and a second set of conductive leads 2008 (diagonal-patterned lines). The leads of first set 2005 extend across bond window 2050, transverse to path 2080, in a horizontal plane substantially parallel to the first surface 2009. In the component as manufactured, and as depicted in FIG. 20, the leads of second set 2008 also extend across bond window 2050, transverse to path 2080, in a horizontal plane substantially parallel to the first surface 2009. As used with reference to the structure of FIG. 20 having a generally planar element such as a dielectric layer, the term "horizontal" refers to the directions in the plane of the element, whereas the term "vertical" refers to the directions transverse to such plane.

The leads of second set 2008 are provided as pairs of lead portions, each such pair including a first lead portion 2012-1 having a fixed end 2017-1 on a first side of the bond window and a second lead portion 2012-2 having a fixed end 2017-2 on the second, opposite side of the bond window. In the component as manufactured, the free end of each lead portion (the end remote from the fixed end) is held in place by an anchor 2011 disposed on the opposite side of the bond window from the fixed end, the anchor being connected to the free end of the lead portion through a frangible link 2010 weaker than the remainder of the lead portion. In the particular embodiment illustrated, both sets of leads are disposed on the first surface 2009 of the dielectric layer, but the leads of both sets may be arranged on the second surface of the dielectric layer or on opposite surfaces of dielectric layer 2000 or within the thickness of the dielectric layer.

As can be observed from FIG. 20, the leads of first set 2005 are interleaved, or interspersed, along the length of path 2080 with the leads of second set 2008. In the particular interleaving pattern shown, one pair of lead portions 2012-1 and 2012-2 of the second set is disposed between each two adjacent leads 2005 of the first set. This pattern is merely illustrative and other patterns may be used. Indeed, although it is preferred that some level of interleaving be used, this is not required. The leads of first set 2005 and the second set 2008 are electrically coupled to each other in series via traces 2001; each such trace extends between a fixed end 2017-1 or 2017-2 of a lead portion of the second set and a neighboring lead 2005 of the first set. In the as-manufactured state of the component depicted in FIG. 20, the lead portions 2012-1 and 2012-2 of each pair of lead portions of second set 2008 are not electrically coupled to each other as illustrated by gap 2007.

Figure 22:
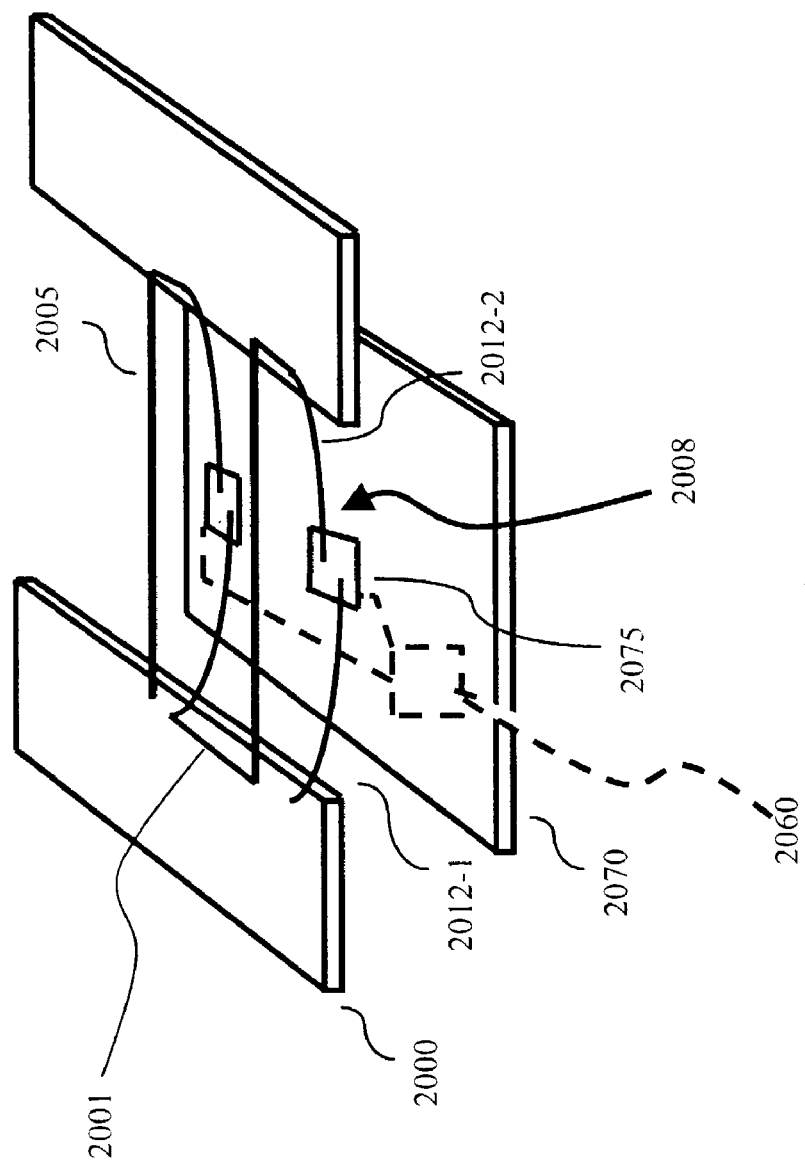
FIG. 22 is a fragmentary perspective view showing a portion of the assembly of FIG. 21.

In a method in accordance according to a further embodiment of the invention, the component discussed above with reference to FIG. 20 is juxtaposed with another element such as a chip 2070 (FIG. 21) having bond pads 2075 on a front surface 2076, so that the second surface 2015 of the dielectric element faces downwardly toward the front surface of chip 2070. As best seen in FIG. 20, the chip and component are positioned so that each pair of lead portions 2012-1 and 2012-2 of the second set 2008 are aligned with a common bond pad 2075 on the chip. The lead portions 2012-1 and 2012-2 are bent out of the horizontal plane so as to form one or more loops in a vertical plane, as illustrated in FIG. 21. During this operation, the frangible portions 2010 (FIG. 20) are broken, so that the free ends of the lead portions can be displaced downwardly into contact with the bond pads 2075. Here again, the bonding process used break the frangible portions and connect the lead portions to the bond pads may be the same process as used to connect other features of the component (not shown) to the chip. As illustrated in FIGS. 21 and 22, the displaced portions 2012-1 and 2012-2 of each pair of lead portions from the second set 2008 make contact with a single bond pad 2075, and are electrically coupled to each other through such bond pad 2075. Thus, each pair of lead portions 2012-1 and 2012-2 of the second set forms an electrically continuous lead 2008 extending across the bond window 2050 and projecting downwardly from the plane of the leads 2005 of the first set.

In this condition an inductor having a solenoidal configuration is formed from the vertically extensive loops of the second set 2008 and the leads of the first set. Each turn of the solenoid includes a lead from the first set 2005, an interconnecting trace 2001 and one of the continuous leads from the second set 2008. The solenoid has loops extending in substantially vertical planes (in the plane of the drawing sheet in FIG. 21) magnetic field vectors arising from electrical currents flowing in the turns of the solenoid extend generally along the axis of the solenoid, and generally parallel to the horizontal planes of substrate 2000 and 2070. This arrangement tends to minimize inductive coupling between the inductor on the component and elements such as leads, traces and potential planes on the substrate or chip lying in planes parallel to the surface of the substrate.

The contact pads 2075 may be "dummy" contact pads, which are not connected to any internal electrical element of chip 2070, so that the inductor is connected to other elements of the circuit only through traces 2002 and 2003 (FIG. 20) on the connection component. Alternatively or additionally, some or all of the contact pads 2075 on the chip 2070 may be connected to internal electrical elements (not shown) of the chip, such as traces or internal electrical circuits. In this case, the contact pads can also serve as terminals for connecting the inductor. Where multiple contact pads along the length of the inductor are connected in this manner, these contact pads 2075 may also serve as taps of the inductive inductor. For example, the chip may be provided with internal switching circuitry 2060 (FIG. 22) for selectively connecting to the inductor through different contact pads, thereby switching a greater or smaller portion of the inductor into or out of the circuit, or with internal circuitry for selectively connecting various contact pads to one another so as to short-circuit one or more turns of the inductor. These arrangements can be used in any circuit where a variable inductance is desired. Similar arrangements can be employed in other inductors having turns defined in part by elements of the connection component and in part by elements on the chip. For example, in the embodiment discussed above with reference to FIGS. 15–17, the conductive elements on the 882 on the chip may be either isolated from the internal circuitry of the chip or connected to the internal circuitry of the chip.

Figure 23:
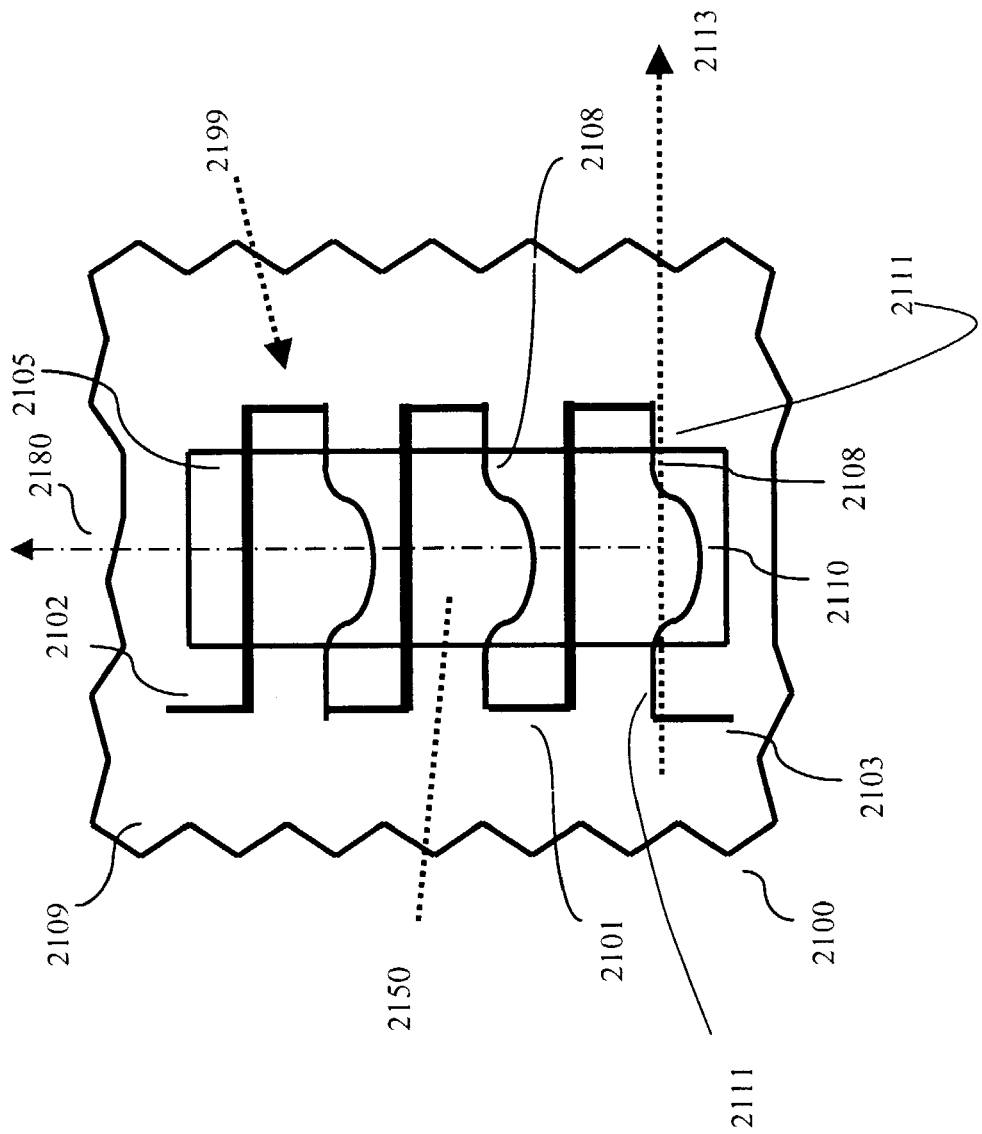
FIG. 23 is a fragmentary, plan view of a component in accordance with a further embodiment of the invention.
Figure 24:
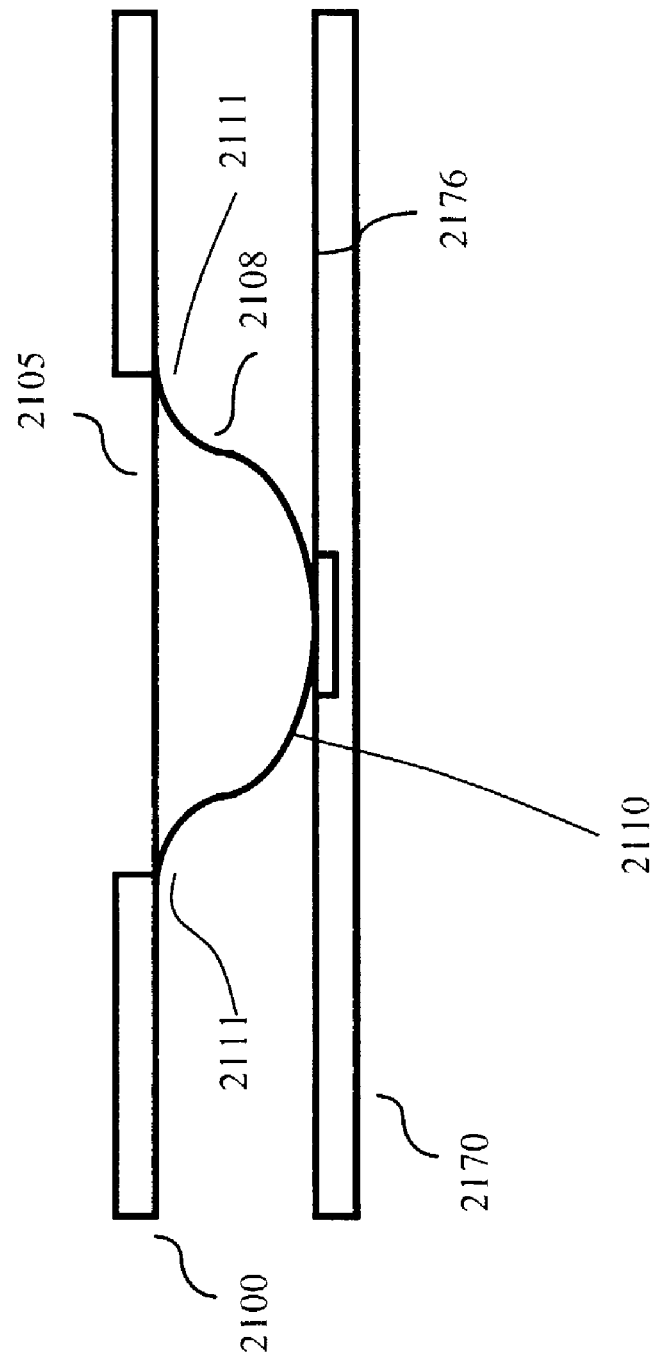
FIG. 24 is a fragmentary, diagrammatic sectional view of an assembly according to a further embodiment of the invention.
Figure 25:
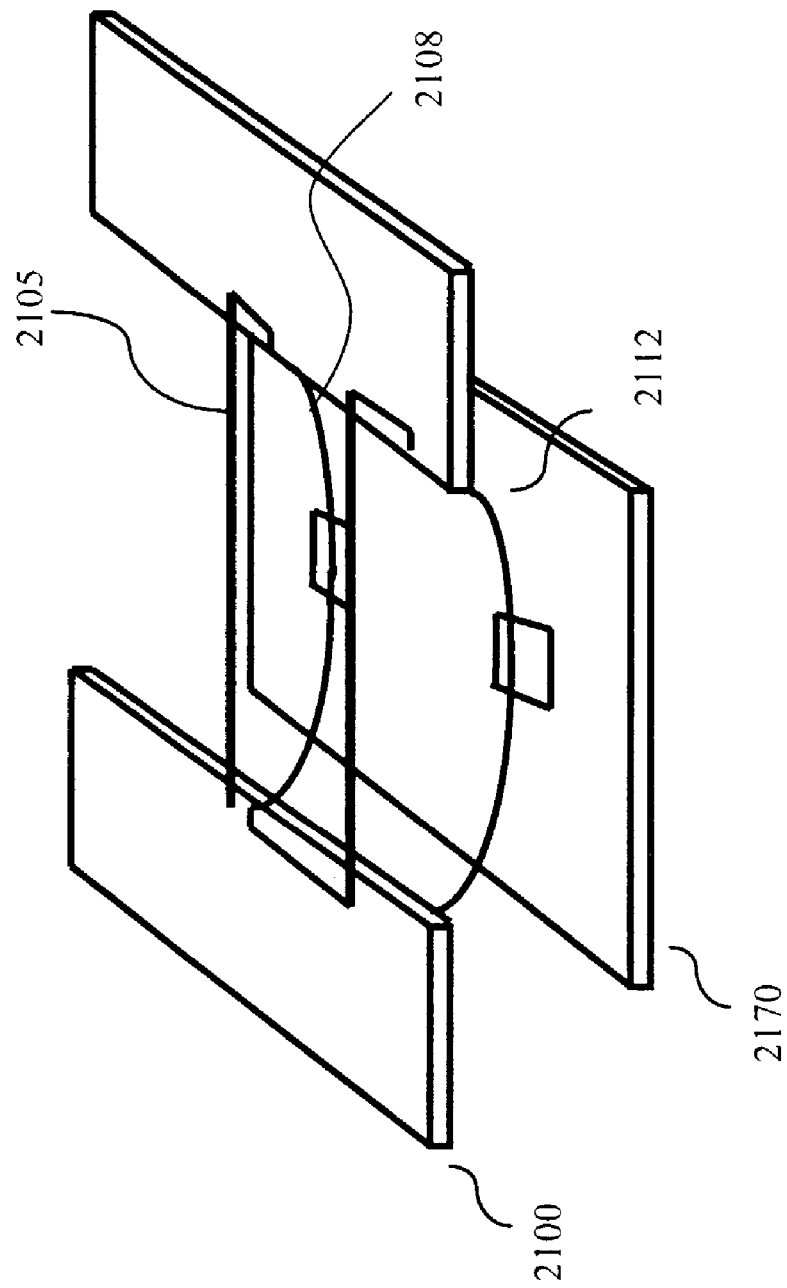
FIG. 25 is a fragmentary perspective view showing a portion of the assembly of FIG. 24.

A component according to a further embodiment of the invention is illustrated in FIGS. 23, 24 and 25. The component and assembly illustrated in these figures is similar to the component and assembly illustrated in FIGS. 20–22. Here again, the component may be as a chip carrier or other connection component used in conjunction with a chip, and again may include elements other than the inductive element structures discussed below. The component includes a dielectric layer 2100 having one or more bond windows as illustrated by bond window 2150 extending along a path 2180. The component includes an inductive element forming structure 2199 and comprises traces 2103 and 2102 for coupling to the inductive element. The inductive element forming structure 2199 includes a number of conductive leads spanning bond window 2150, which once again include leads of a first set 2105 and leads of a second set 2108. Here again, the leads of first set 2105 extend across bond window 2150, transverse to path 2180, in a horizontal plane substantially parallel to the first surface 2109 of the dielectric layer. The leads of the second set 2108 also extend across bond window 2150, transverse to path 2180. In the as-manufactured condition of the component, shown in FIG. 23, the leads of the second set also lie in a horizontal plane substantially parallel to the first surface 2109. Here again, the leads of the first and second sets may also be arranged on the same surface of dielectric layer 2100, on opposite surfaces of the dielectric layer, or within the thickness of the dielectric layer. As shown in FIG. 23, the leads of the first set 2105 are interleaved with the leads of the second set 2108 such in the direction along path 2180, a lead from the first set 2105 is followed by a lead from the second set 2108. This pattern is merely illustrative and other patterns may be used. The leads of the first and second sets are electrically coupled to each other in series via traces 2101.

In the as-manufactured condition shown in FIG. 23, each lead of the second set 2108 is curved in the horizontal plane. The ends 2111 of the each second-set lead 2108 on opposite sides of bond window 2150 define a axis 2113, referred to herein as the twist axis of the lead. Each second-set lead 2108 has a crank portion 2110 aligned with the bond window. In the as-manufactured condition of FIG. 23, the crank portion 2110 of each such second-set lead is offset in a horizontal direction from the twist axis 2113 of the lead. The first-set leads 2105 may be straight as illustrated in FIG. 23, or may have a construction similar to the second set leads 2108.

The component of FIG. 23 can be used in a method shown in FIG. 24. In this method, one or more of the leads in second set 2108 are bent out of the horizontal plane so as to form one or more loops in a vertical plane, e.g., vertically extensive loops arrayed along the path 2180. Thus, at least one lead from the second set 2108, as represented by lead 2112, is bent down through the bond window such that the lead lies in a generally vertical plane. For example, the crank section 2110 of each such lead may be engaged by a tool such as a thermosonic bonding tool and forced downwardly. In this process, the lead twists generally around axis 2113, so that the crank section 2110 is now disposed below the ends 2111 of the lead, as depicted in FIG. 24. Stated another way, the twisting process transforms the original horizontal curvature of the second-set leads into a curvature in the vertical plane. As the second-set leads lead 2108 are bent in this manner, they may be bonded to a surface 2176 of another substrate—here represented by a chip 2170. For example, each crank section of a second-set lead optionally may be bonded to a contact pad 2175 on the chip. As best seen in the perspective view (FIG. 25) the leads cooperatively form a solenoid similar to the solenoid of FIG. 22.

In this process, the leads of second set 2108 that are displaced downward relative to dielectric element 2100 are not broken. Thus, in accordance with this aspect of the invention, at least one lead having an initial curvature in a horizontal plane is displaced in a vertical direction so as to at least partially straighten the curvature in the horizontal plane and impart a curvature in the vertical plane.

Figure 26:
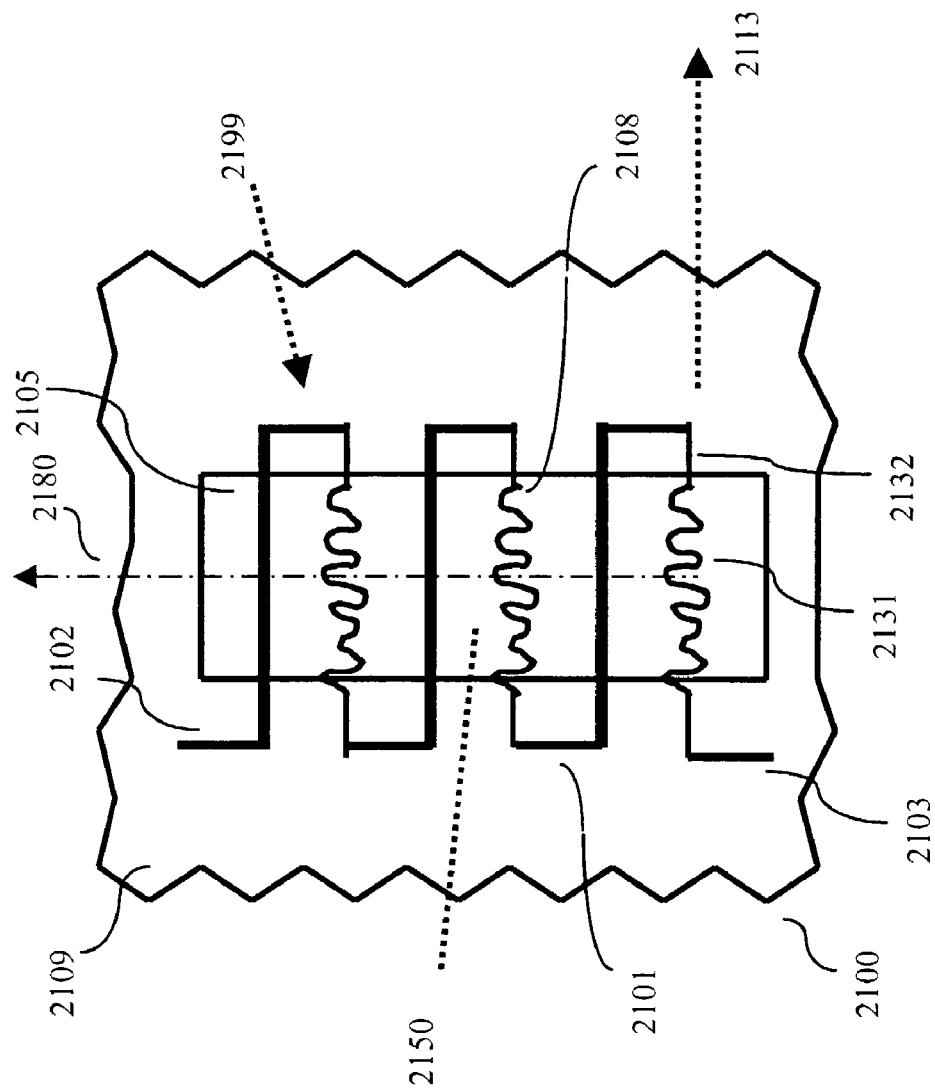
FIG. 26 is a fragmentary, plan view of a component in accordance with a further embodiment of the invention.

Another embodiment is shown in FIG. 26 illustrating that shapes—other than a crank shape—may be used for one, or more, leads spanning the bond window 2150. In this example, the shape of lead 2131 of second set 2108 curves back and forth such when lead 2131 is displaced downward through bond window 2108, the curves in lead 2131 straighten to form vertically extensive loops similar to that shown in FIGS. 24 and 25.

An encapsulant can be added to the assemblies described herein to at least partially surround the conductors forming an inductive element. In addition, a ferromagnetic material may be placed within the inductive element. This can be accomplished by, e.g., including a ferromagnetic material within the encapsulant. Further, it should be appreciated that a combination of frangible-type leads as discussed above in connection with FIGS. 20–22 and bendable or horizontally curved leads as discussed with reference to FIGS. 23–26 may be used in a single assembly as described herein. Additionally, the inductance value of the inductor can be varied by controlling the number of loops formed. For example, in the embodiments of FIGS. 23–25, some of the conductors of the second set may be left in their original, as-manufactured condition, and thus may remain in the same plane as the leads of the first set, to reduce the number of loops and thus reduce the inductance value. Similarly, in the embodiment of FIGS. 20–22, some of the leads of the second set may be formed by connecting the lead portions of a particular pair of lead portions to one another without displacing them from their as-manufactured plane as, for example, by wire-bonding them to one another.

Figure 27:
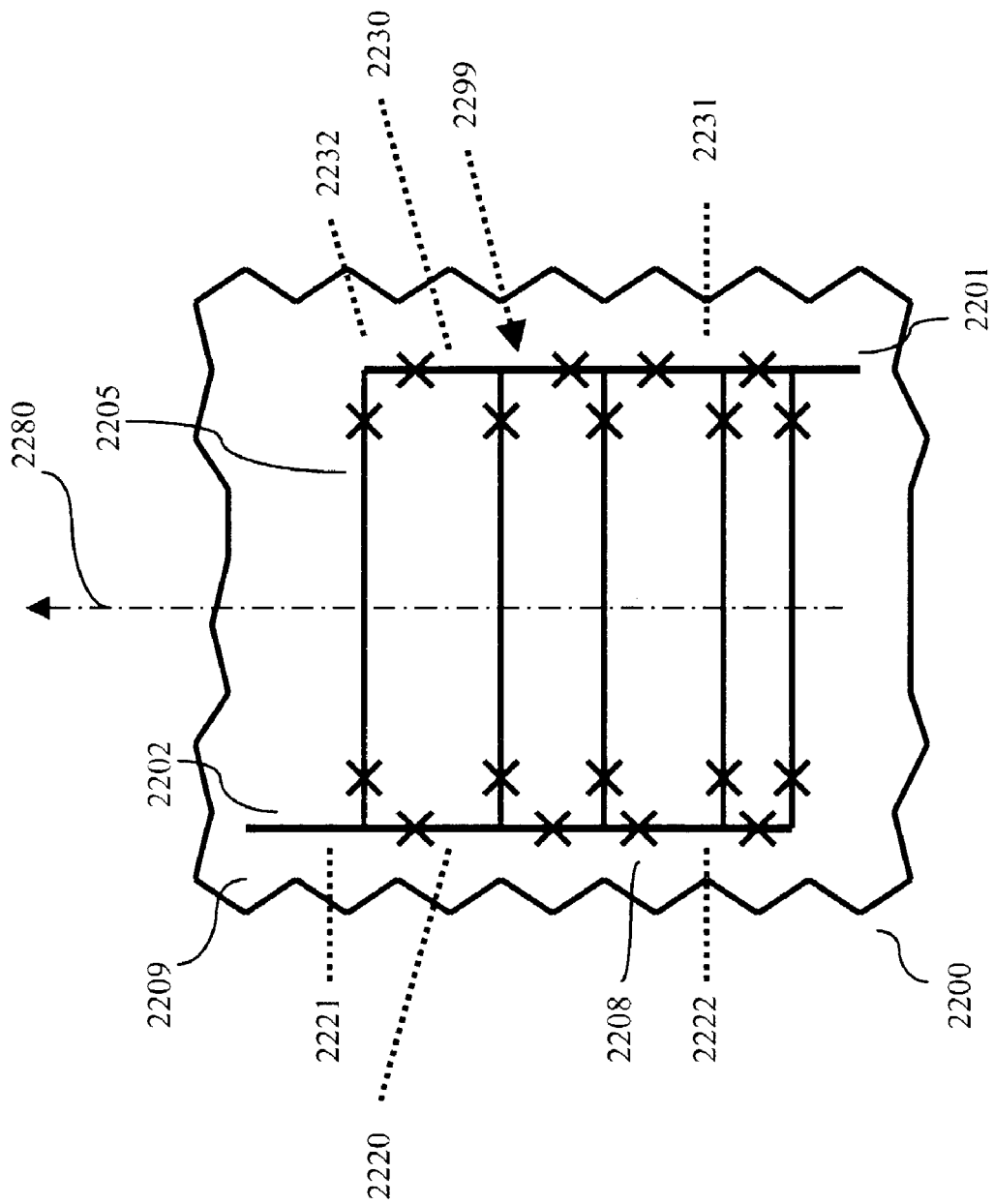
FIGS. 27 and 28 are fragmentary, plan views of a component in accordance with a further embodiment of the invention.
Figure 28:
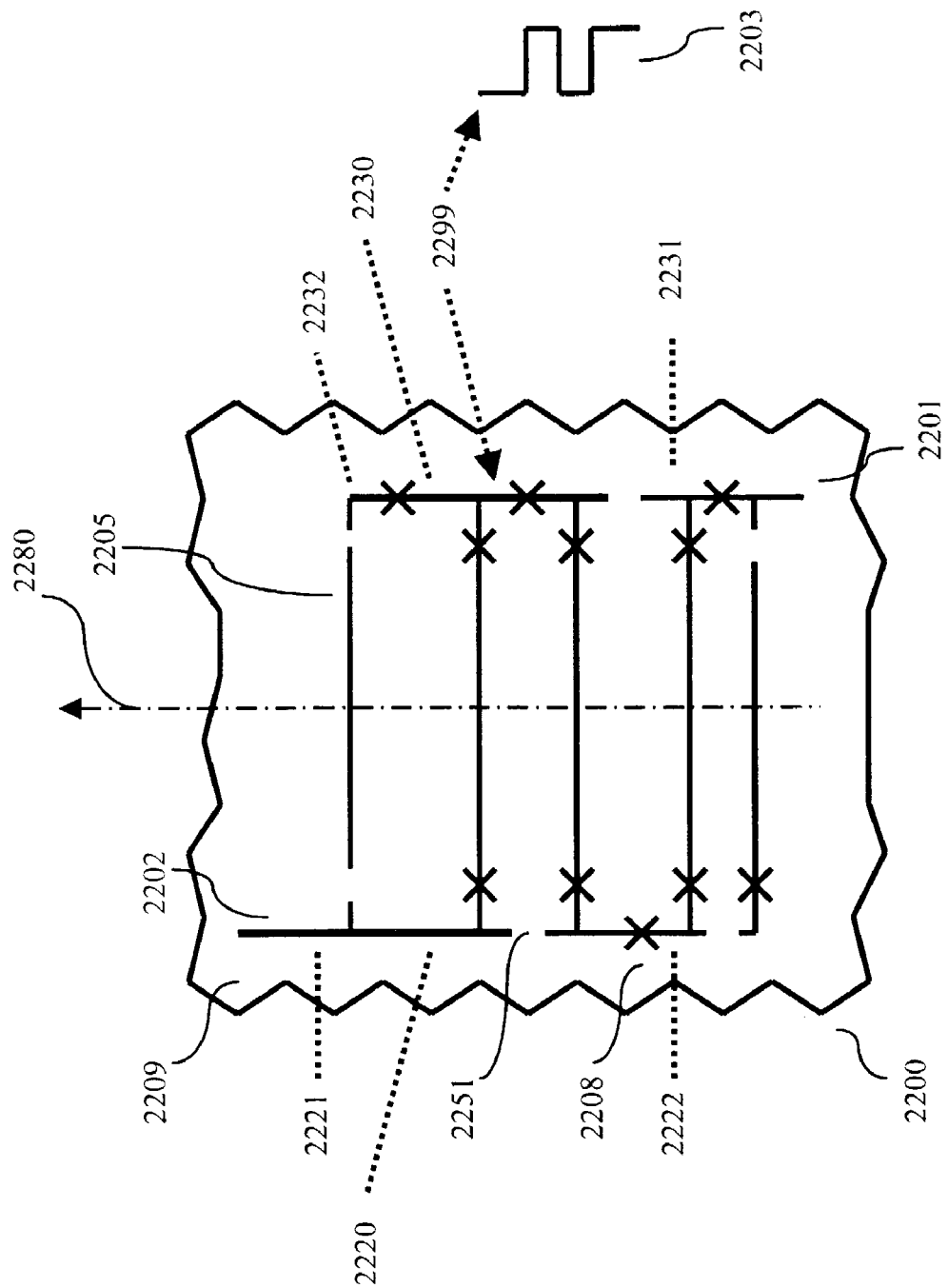

A component according to another embodiment of the invention is shown in FIGS. 27 and 28. The component includes a substrate such as, for example, a chip carrier or other connection component used in conjunction with a chip. The substrate includes a dielectric layer 2200. Dielectric layer 2200 includes an inductive element 2299 and traces 2201 and 2202 for coupling to the inductive element. The inductive element includes a pair of main conductors 2220 and 2230 extending on opposite sides of a path 2280. Main conductor 2220 has a proximal end 2221 and a distal end 2222; whereas main conductor 2230 has a proximal end 2231 and a distal end 2232. The inductive element further includes a number of cross-connectors in the form of leads 2205 extending between the main conductors at spaced-apart locations between the proximal and distal ends of the main conductors. The cross-conductors and main conductors may be arranged on a first surface 2209 of dielectric layer 2200, on both surfaces of the dielectric layer, or within the thickness of the dielectric layer. As can be observed from FIG. 27, inductive element 2299 includes a number of breakable, or frangible, portions 2208, each represented by the X symbol.

In a method according to another aspect of the invention, one, or more, of the frangible sections 2208 may be broken to selectively determine an inductive value for inductive element 2299. In other words, the conductive structure of inductive element 2299 is modified by breaking one or more of the frangible portions to break connections. This is illustrated in FIG. 28, which shows breaks 2251 in the main conductors and in some of the cross-conductors leaving a continuous conductive path in the form of a serpentine shape, separately illustrated at 2203 in FIG. 28. The particular serpentine shape is merely illustrative; depending on the pattern of breaks made during this step, the conductive path may be longer or shorter and may have more or fewer bends. Thus, the breaking step sets the inductive value of inductive element 2299. Certain methods of forming and using frangible portions of leads to selectively break connections are described in International Patent Application PCT/US0232251/designating the U.S., entitled "Stacked Packages," filed Oct. 9, 2002, the disclosure of which is incorporated by reference herein. As discussed in greater detail in such application, the leads may extend across disconnection apertures such as holes or slots in the dielectric element at each frangible section, and the frangible sections can be broken by advancing a tool into each disconnection aperture where a break is to be made.

Figure 29:
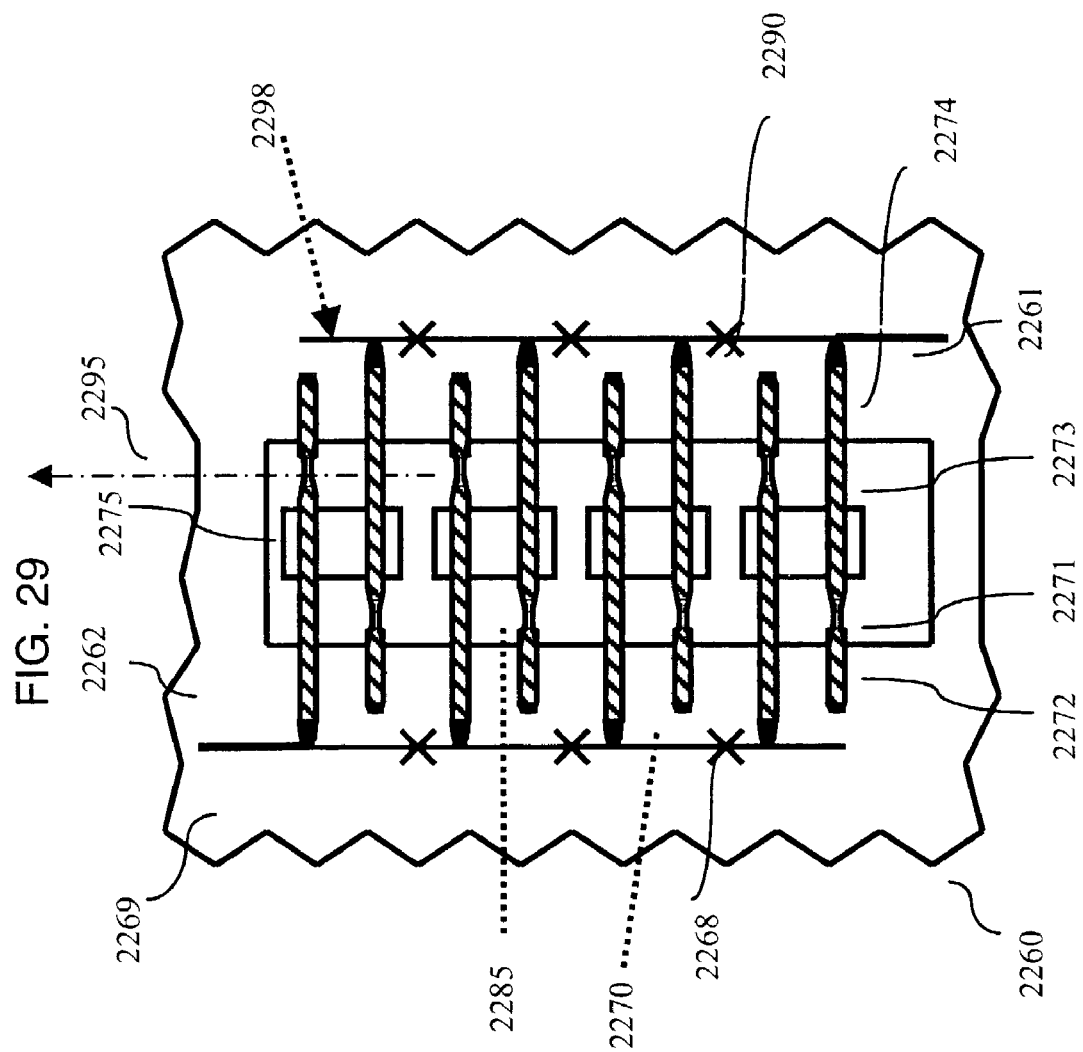
FIGS. 29 and 30 are fragmentary, plan views of a component in accordance with a further embodiment of the invention.
Figure 30:
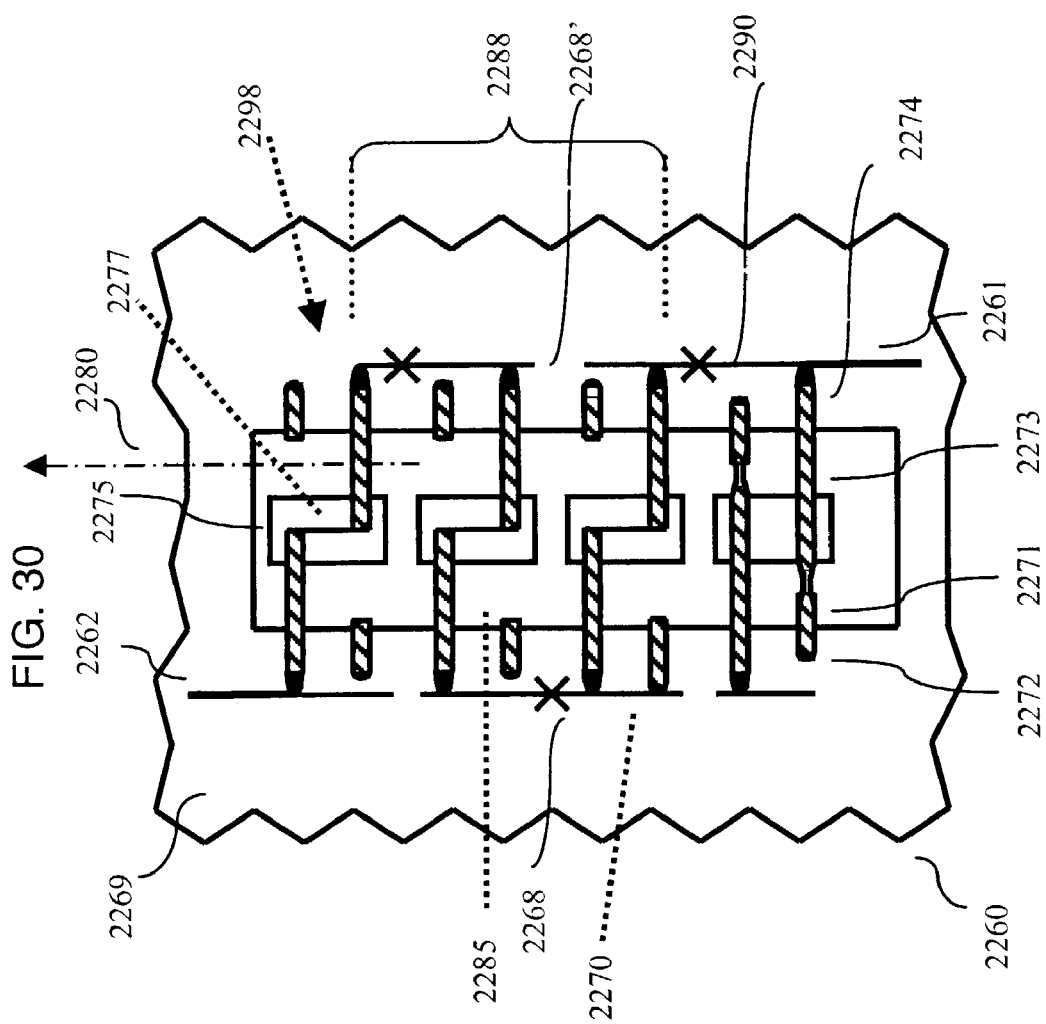

Another embodiment of an inductor element in accordance with an aspect of the invention is shown in FIGS. 29 and 30. FIG. 29 is similar to the inductive element shown in FIG. 27. In FIG. 29, a substrate such as, for example, a chip carrier or other connection component used in conjunction with a chip includes a dielectric layer 2260 having one or more bond windows as illustrated by bond window 2285 extending along a path 2295. The path 2295 illustratively corresponds to a lengthwise direction of bond window 2285. Dielectric layer 2260 includes an inductive element 2298 and traces 2261 and 2262 for coupling to the inductive element. Inductive element 2298 includes main conductors 2270 and 2290 extending along path 2295 on opposite sides of the bond window 2285. The inductive element further includes a number of conductive leads 2274 spanning bond window 2285. As can be observed from FIG. 29, each lead 2274 includes a frangible portion 2271, an anchor portion 2272 and a lead portion 2273. Leads 2274 are arranged in pairs, similar to the pairs of lead portions discussed above with reference to FIG. 20. One lead of each pair has its lead portion 2273 connected to the first main conductor 2270 whereas the other lead portion of the pair has its lead portion connected to the other main conductor 2290. In the as-manufactured condition, depicted in FIG. 29, the leads do not form cross-connections between the main conductors. In the as-manufactured condition, the leads 2274 extend across bond window 2285, transverse to path 2295, in a horizontal plane substantially parallel to the first surface 2269. The Each of the main conductors 2270 and 2290 and includes a number of frangible sections 2268, indicated by the symbol X, similar to the frangible sections 2208 discussed above with reference to FIG. 27.

Figure 31:
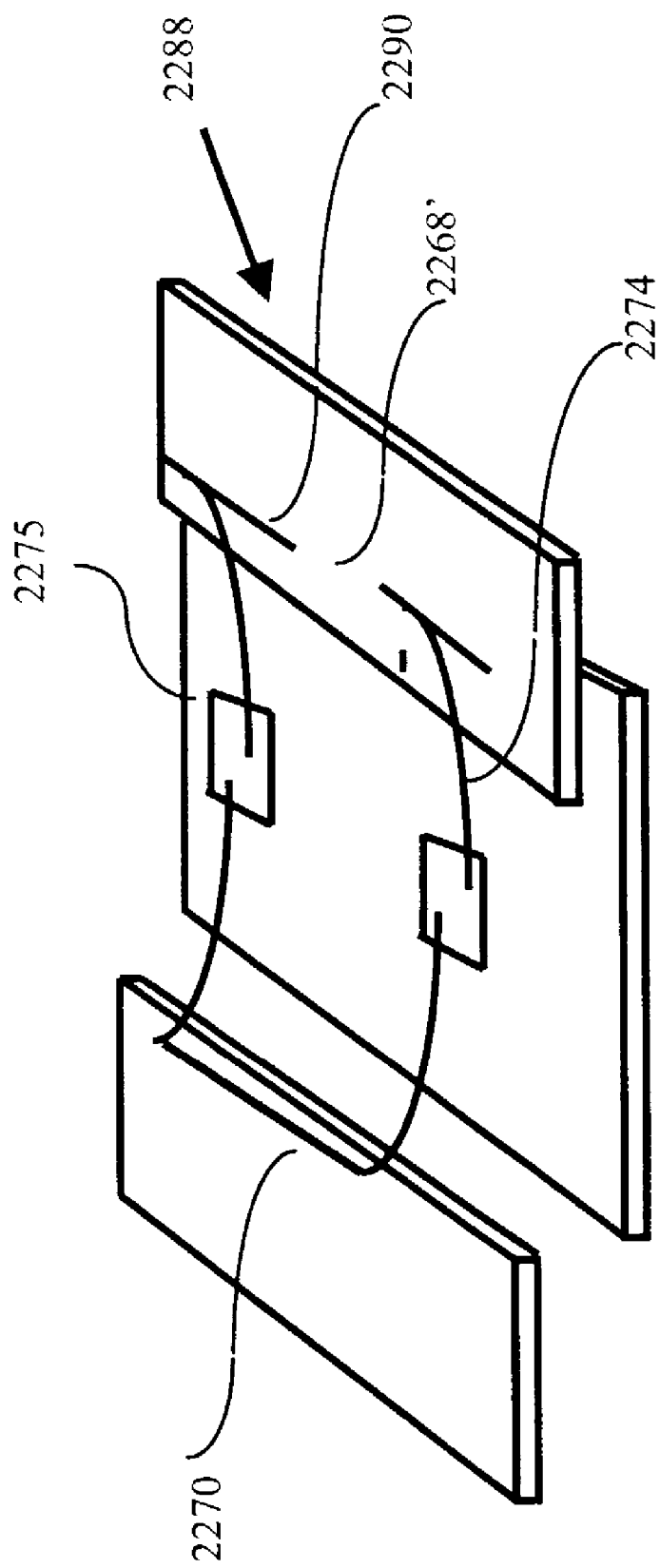
FIG. 31 is a fragmentary perspective view showing a portion of the assembly of FIG. 30.

In a method according to a further embodiment of the invention, the component is juxtaposed with a chip or other substrate having a plurality of conductive bond pads 2275, so that the bond window 2285 overlies the bonds 2275, and so that each pair of leads 2274 is aligned with a common bond pad. Pairs of leads 2274 are selectively bonded to the bond pads 2275. That is, some pairs of leads are selected and bonded, whereas other pairs are left unbonded. The bonding step itself may be similar to the process discussed above for bonding the lead portions in the embodiment of FIGS. 20–22. Each bonded pair forms a continuous cross-connection 2277 between the main leads 2270 and 2290. Also, the frangible sections 2268 of the main leads are broken at selected locations 2268' along the length of the main leads, all as shown in FIG. 30. The combined action of making cross-connects between the main leads at selected locations and breaking the main leads at selected locations forms a continuous conductive path in a pattern which may be similar to the serpentine pattern 2203 discussed above with reference to FIG. 28. Here again, the particular pattern, and hence the inductance value, can be chosen by choosing the locations where cross-connects are to be formed and where the main leads are to be broken. A section of a completed assembly is further illustrated in FIG. 31, which shows a fragmentary portion 2288 of a perspective view of the inductive element 2298. In further variants, the action of selectively making cross-connects, as in FIGS. 29–31, can be combined with the action of selectively breaking cross-connects. Also, although the step of bonding pairs of leads to common bonding pads discussed with reference to FIGS. 29–31 involves breaking frangible sections of leads to release the free ends of the lead portions for bonding, this is not essential. For example, the pairs of leads used in this step can be provided with a "crank" configuration as discussed with reference to FIGS. 23–24, or with a convoluted configuration as discussed with reference to FIG. 26, so that these leads can be twisted or stretched as they are bent downwardly into engagement with the bond pads. Indeed, because the inductor-forming process according to this embodiment does not depend on forming vertically-extensive loops, the selective connection process can be performed without bending the leads downwardly from their as-manufactured plane.

Figure 32:
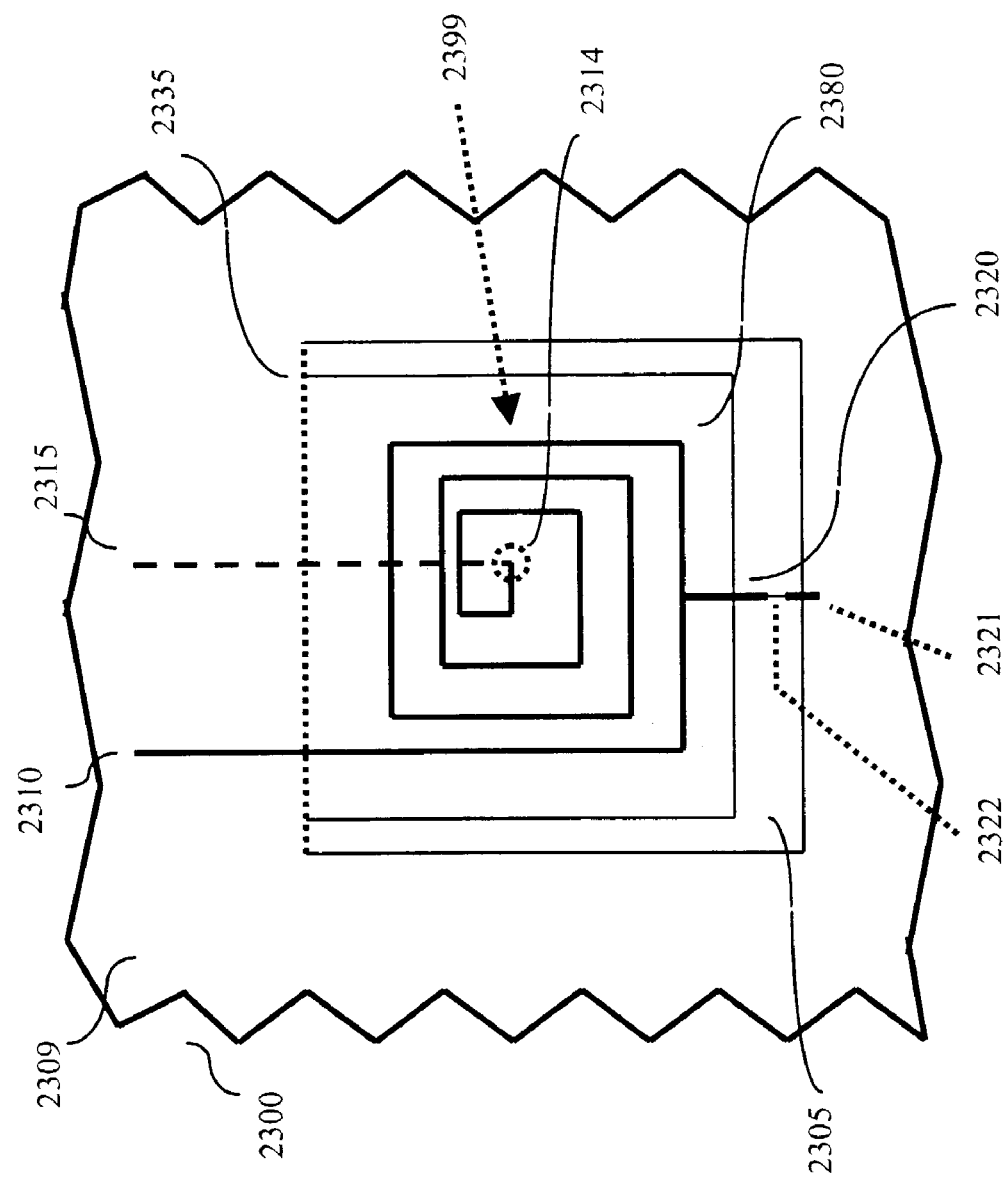
FIG. 32 is fragmentary, plan view of a component in accordance with a further embodiment of the invention.

Another illustrative inductor in accordance with an aspect of the invention is shown in FIG. 32. Here again, a component bearing the inductor may be a substrate such as a chip carrier or other connection component used in conjunction with a semiconductor chip. The component includes a dielectric layer 2300 having one or more inductive elements 2399. The dielectric layer 2300 may also bear other features such as terminals for mounting to a circuit board, e.g., via a surface mount (not shown), thermal conductors, leads which can be connected to one or more chips in the assembly, shielding elements and any or all of the other features desired in a connection component. Inductive element 2399 is similar to the spiral inductor described earlier with respect to FIGS. 6–9 and has a spiral shape formed from traces disposed on a surface 2309 of a substrate 2300. Inductive element 2399 comprises trace 2310 on surface 2309 and trace 2315 on the opposing surface for coupling to the inductive element. As can be observed from FIG. 32, trace 2315 is coupled to the traces on surface 2309 through via 2314. Further, substrate 2300 includes a flap 2380 upon which a portion of inductive element 2399 is formed. Flap 2380 is coupled to substrate 2300 via fold line 2335. Flap 2380 is shown having a space 2305 around the remaining three sides of flap 2380. Space 2305 should be at least large enough to allow flap 2380 to bend about the fold line 2335. Also disposed on flap 2380 is dummy trace 2320. Although dummy trace 2320 is shown as a part of inductive element 2399, as will be come apparent from the description below, this is not required. Dummy trace 2320 illustratively comprises a frangible portion 2322 and an anchor portion 2321. The dummy trace initially holds flap 2380 in place during the assembly process (described below). Flap 2380 is initially held in a horizontal plane substantially parallel to surface 2309 of substrate 2300. The features on the dielectric element, including the features on the flap, can be formed while the dielectric element is in a flat configuration. Merely by way of example, the dielectric element may be formed as a substantially flat sheet of a dielectric material, and the conductive features may be formed by conventional additive or subtractive processes used for forming leads and other metallic features on conventional tape automated bonding tapes. The space 2305 surrounding and demarcating the flap may be formed, for example, by ablating the dielectric material using a laser which does not substantially ablate the metallic features.

Figure 33:
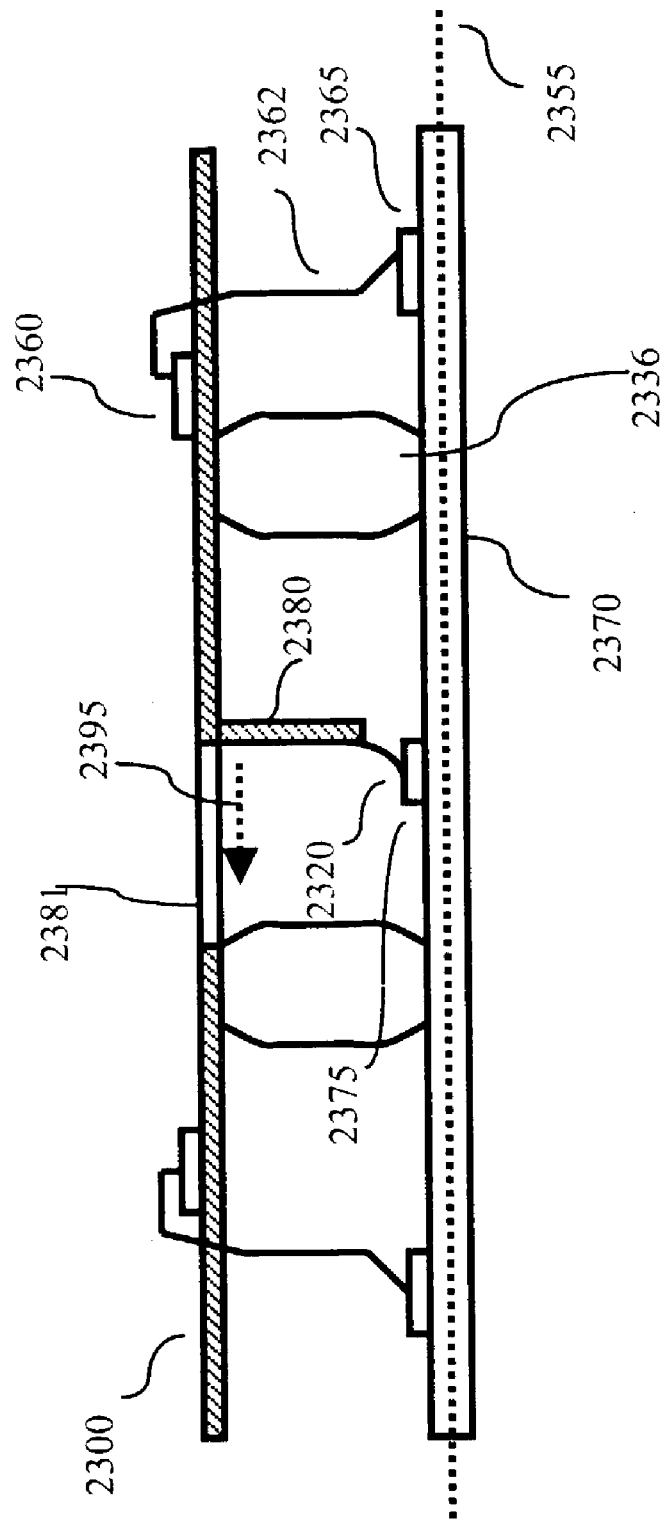
FIGS. 33, 34, and 35 are fragmentary, diagrammatic sectional views of assemblies according to further embodiments of the invention.

A method for creating an inductive assembly in accordance with an aspect of the invention is shown in FIG. 33. The component is assembled with another substrate 2370, which may be a chip, circuit board or the like, so that the dielectric layer 2300 overlies substrate 2370. The main portion of the dielectric layer may be supported above the substrate by spaced-apart elements or "nubbins" 2336 as discussed above with reference to FIG. 1, or by a other features (not shown). The frangible portion 2322 of the dummy lead is broken and flap 2380 is bent out of the horizontal plane as illustrated in FIG. 33. For example, the dummy lead may be engaged by a bonding tool such as an ultrasonic or thermosonic bonding tool and forced downwardly towards substrate 2370 so as to bend the flap. In this operation, flap 2380 is bent into a vertical plane thus forming a bond window 2381 in substrate 2300. Through this bond window, dummy trace 2320 is attached to a contact pad 2375 of a lower substrate 2370, e.g., a semiconductor chip. The mounting of flap 2380 to contact pad 2375 fixes inductive element 2399 in a vertical position so that the magnetic field vector 2395 generated by electrical currents flowing in the inductive element lies in a substantially horizontal plane. Because conductive elements such as traces and ground planes in either component 2300 or lower substrate 2370 are predominantly in horizontal planes, this substantially reduces electromagnetic coupling between the inductive element and the traces and ground planes of the component and substrate. Illustratively, a typical horizontally-extending ground plane 2355 is shown with respect to lower substrate or chip 2370. Also, the assembly shown in FIG. 33 may include additional circuit connections between substrate 2370 and substrate 2300 such as represented by terminals 2360, 2365 and connecting leads 2362. The operations used to bond leads 2362 may employ the same bonding technique as used to bond dummy lead 2320 to pad 2375, so that both steps can be performed in a single operation. Thus, the flap bending operation can be performed at essentially zero cost. Also, although lead 2320 on the flap is referred to above as a "dummy" lead, this lead optionally may be used to provide an additional electrical connection to the inductor, provided that pad 2375 on the chip or lower substrate 2370 is electrically connected to internal circuitry of the chip or lower substrate.

Figure 34:
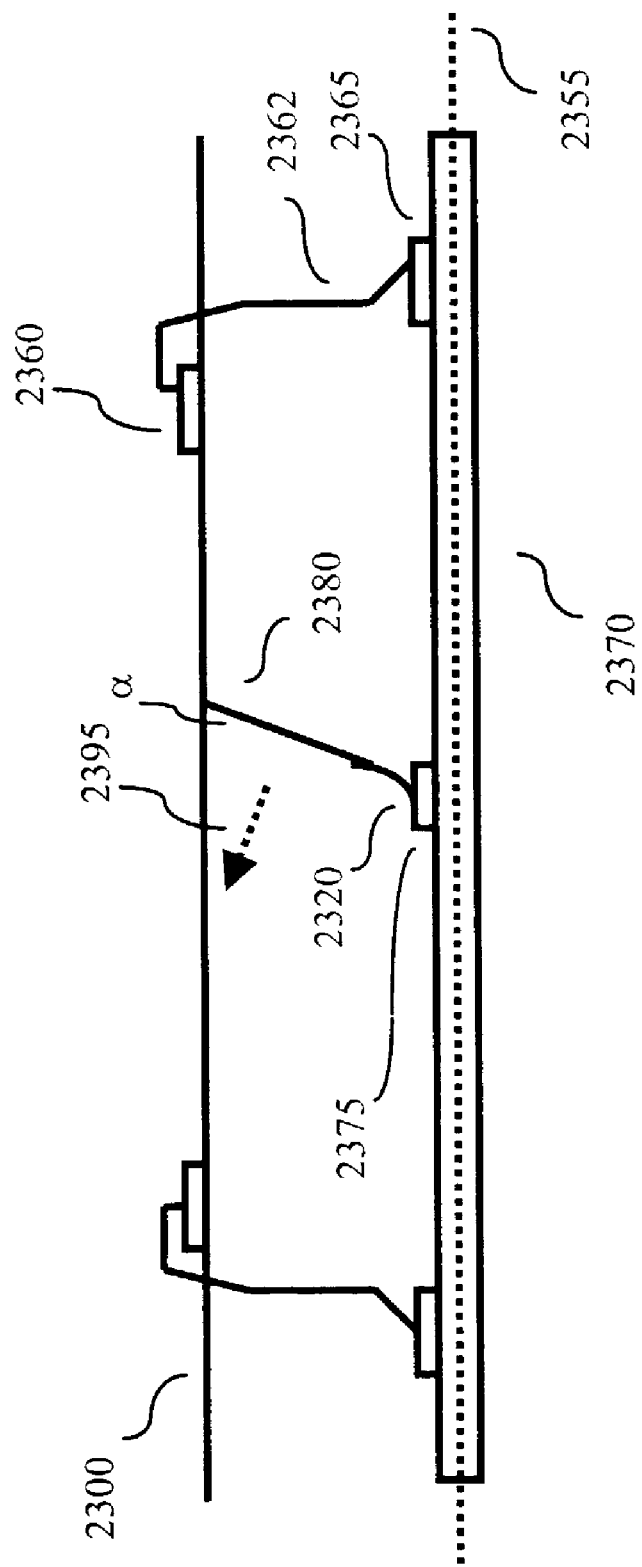

In a further variant, the flap 2380 may be bent at angles other than 90°, e.g., acute or obtuse angles with respect to a substrate to which the fold is attached. This is illustrated in FIG. 34 with respect to substrate 2300, where flap 2380 forms an acute angle α with a lower surface of substrate 2300. Although the value of α can vary, it is preferably between about 45° and about 135°, such that only a minor component of the magnetic field value lies in the vertical dimension. Although the embodiments of FIGS. 32–34 are described above in the context of using a dummy lead of the inductive element for the purpose of fixing the fold into a particular position, other methods may be used. For example, the portion of the fold bearing the inductor may be provided with a metal tab or pad not electrically coupled to the inductor for use in mounting to the other substrate. In yet another alternative, the flap may be held in position by frictionally engaging the flap with the chip or other substrate; by applying an adhesive or encapsulant to the chip or the flap; or by applying a clip or other mechanical attachment.

Figure 35:
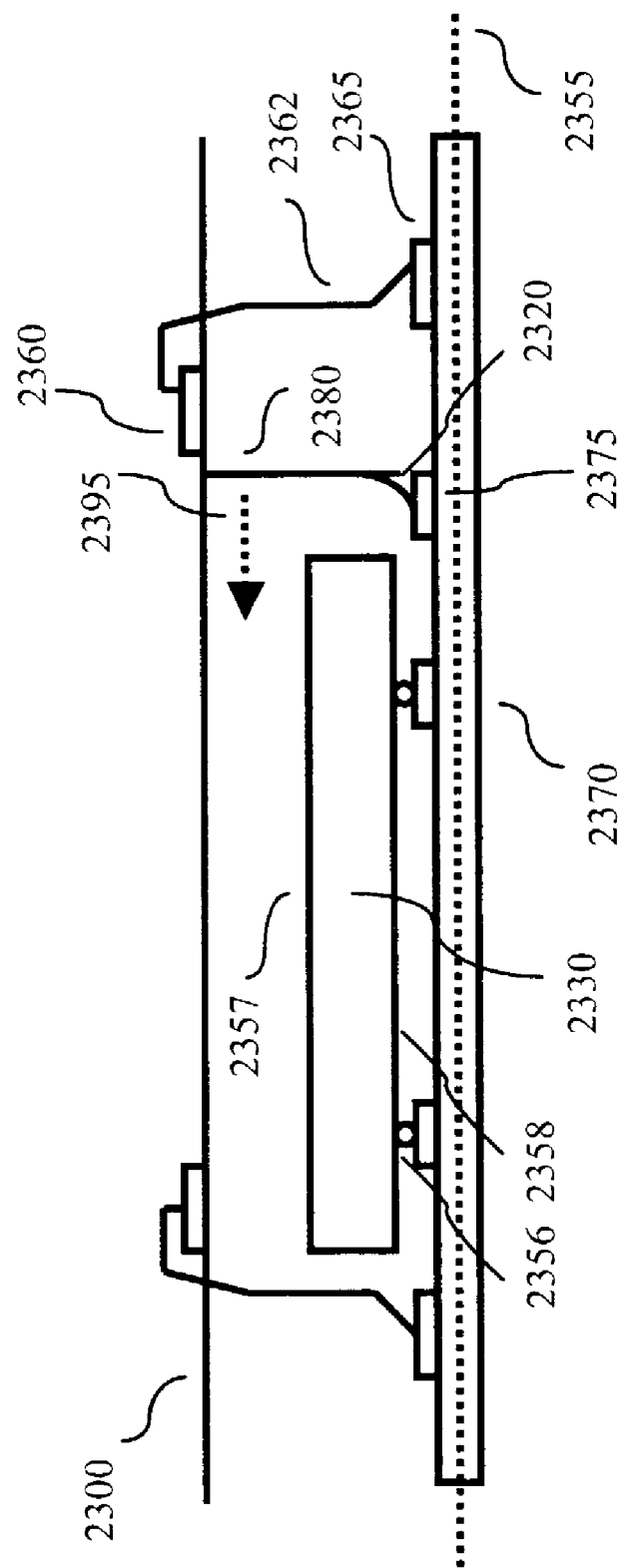

Another variation is shown in FIG. 35. In this variation, flap 2380, in its folded condition, extends below a confronting surface 2357 of a chip 2330 at, illustratively, 90° with respect to substrate 2300. Again, the angle with respect to substrate 2300 may be other than 90°. Flap 2380 may be fixed in position via use of a dummy lead to a portion of another substrate 2370, or by any of the other techniques discussed above. Illustratively, the assembly in FIG. 35 shows a face-to-face mounting (such as described above with respect to the embodiment of FIG. 4) between chip 2330 and substrate 2370. Again, substrate 2370 can be a passive chip as used in the arrangement of FIG. 4, another active chip, a chip carrier, another connection component, or, e.g., a heat sink. Chip 2330 is mounted over substrate 2370 so that the front or contact-bearing surface 2358 of chip 2330 confronts the contact-bearing surface of substrate 2370. The component 2300 bearing the flap is mounted over the rear surface of chip 2330. The contacts of chip 2330 are bonded to the contacts of substrate 2370 by any of the techniques discussed above with reference to FIG. 4.

Figure 36:
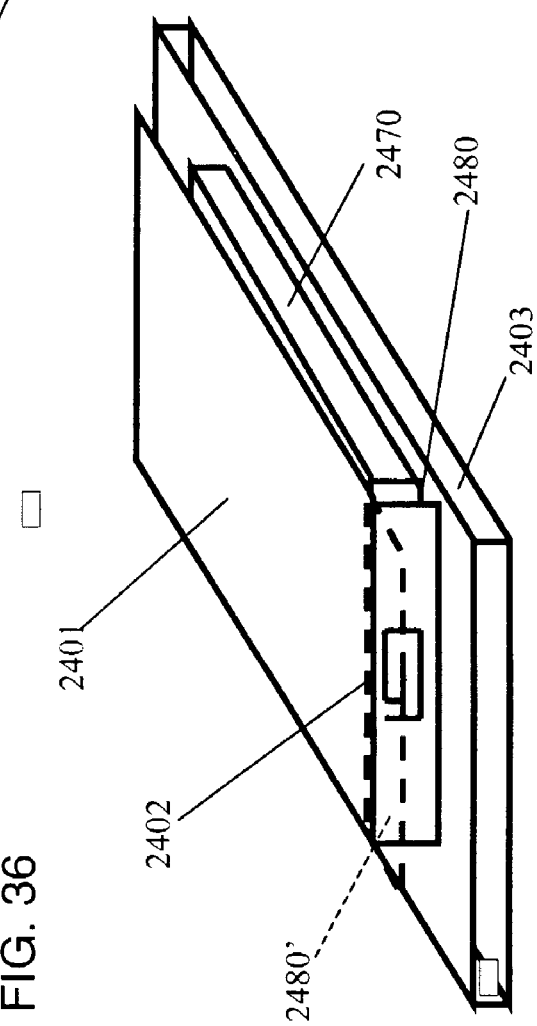

Another illustrative embodiment is shown in FIG. 36. In this embodiment, an inductor is formed on an end portion 2480 of a substrate 2400. End portion 2480 is displaced from an as-manufactured position, (shown in broken lines at 2480')in which the end portion lies in horizontal plane along with the main portion 2401, by bending substrate 2400 about a fold line 2402. In this example, the end portion 2480 after bending lies in a preferred substantially vertical plane to substrate 2400 but can be at any angle, as noted above. Thus, even though the substrate does not include a distinct flap, the portion bearing the inductor can be displaced relative to the main portion. As can be observed from FIG. 36, the assembly further comprises an additional substrate, such as a chip 2470. Here again, the main portion of the substrate overlies a surface of the additional substrate or chip. As in the embodiments discussed above, bending the inductor-bearing portion of the substrate reorients the inductor so that the magnetic field vector of the inductor is no longer perpendicular to the surface of the chip. The bent portion of the substrate can be secured in position by any of the means discussed above with reference to the flap. For example, the bent portion of the substrate can be secured to a further substrate such as a heat sink or another chip 2403 underlying the principal substrate 2470.

Figure 37:
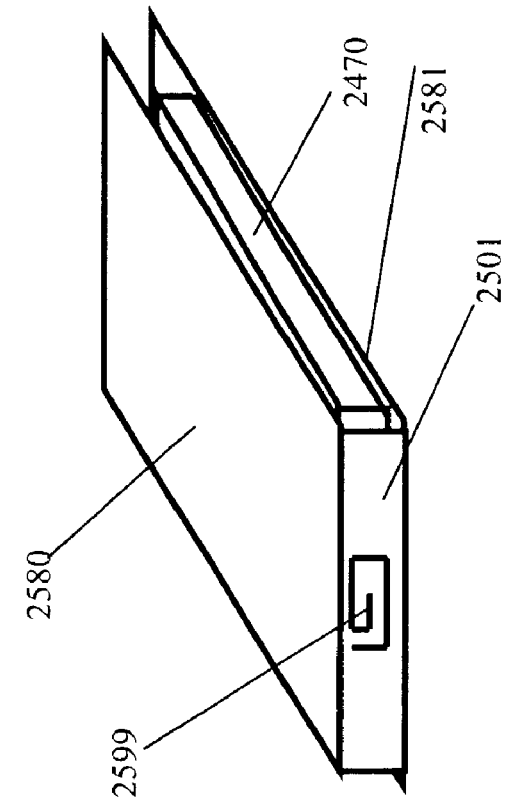
FIGS. 36 and 37 are diagrammatic perspective view depicting assemblies according to still further embodiments of the invention.

Numerous other variations and combinations of the features discussed above can be utilized without departing from the present invention. The various inductors and can be combined with one another in a single component. For example, a solenoidal inductor as discussed with reference to FIGS. 15–26 can be formed in the same assembly as a customizable inductor as discussed with reference to FIGS. 27–31, so that both inductors are connected in a common circuit. The customizable inductor can be used to adjust the overall inductance value of the circuit. In a further variant, the approaches discussed above can be combined with one another in a single inductor. For example, the features which form a solenoidal inductor in the embodiments of FIGS. 15–26 can be provided with selectively breakable connections or selectively makeable cross-connects, as in FIGS. 27–31, within the inductor structure itself, to provide for selection of a particular inductance value. Also, although the inductors have been described above as used in chip packages, the same inductors can be used in other electronic assemblies. In a further variant (FIG. 37) the component substrate may be bent to wrap around one or more chips or other components 2570. In this embodiment, the inductor-bearing portion of the component substrate or dielectric layer, having an inductor 2599 thereon, lies between two main portions 2580 and 2581. Here again, the inductor-bearing portion 2501 of the substrate is bent out of the plane of a first main portion 2580 and out of the plane of the second main portion 2581. Components folded to wrap around a chip or other element can be used as disclosed in copending, commonly assigned U.S. Provisional Patent Application Ser. Nos. 60/403,939, filed Aug. 16, 2002, and 60/401,391, filed Aug. 5, 2002, and in U.S. Pat. No. 6,121,676, the disclosures of which are incorporated by reference herein.

In the embodiments discussed above, the inductor-bearing portion of the component is bent after assembly of the component to a chip or other element. However, the bending operation may be performed prior to assembly. Also, the inductor-bearing portion of the component may be bent away from the chip or other substrate, rather than towards it as in the embodiments discussed above. Moreover, the inductor on the component need not be a spiral inductor; other forms of inductors can be used as well.

As these and other variations and combinations of the features set forth above can be utilized, the foregoing description of the preferred embodiment should be taken by way of illustration rather than by limitation of the invention.

What is claimed is:

1. A chip assembly comprising:
   (a) a chip having a front surface with contacts thereon;
   (b) a substrate overlying said front surface, said substrate including a dielectric structure having a major surface extending in a first direction and in a second direction transverse to said first direction, said first and second directions being at least generally parallel to said front surface, said substrate further including a first inductor including one or more conductors extending in a spiral on said dielectric structure, said one or more conductors having leads formed integrally therewith, at least some of said leads extending in a third direction away from said major surface towards at least some of said contacts on said chip.

2. A chip assembly, comprising:
   (a) a chip having a front surface with contacts thereon;
   (b) a generally planar substrate overlying said front surface, said substrate including a planar dielectric structure and a first inductor including one or more conductors extending in a spiral on said dielectric structure, said one or more conductors having leads formed integrally therewith, at least some of said leads extending from said substrate to at least some of said contacts on said chip, said substrate further including a second inductor including one or more conductors extending in a spiral on said dielectric structure and second inductor leads formed integrally with the one or more conductors of said second inductor, said second inductor overlying said first inductor so that said first inductor is disposed between said second inductor and said chip, said second inductor leads being connected to said chip, one or more of said second inductor leads extending through said first inductor between turns thereof.

3. A chip assembly as claimed in claim 1, wherein said dielectric structure includes one or more bonding windows, said leads extending into alignment with said one or more bonding windows.

4. A chip assembly, comprising:
   (a) a chip having a front surface with contacts thereon;
   (b) a generally planar substrate overlying said front surface, said substrate including a planar dielectric structure and a first inductor including one or more conductors extending in a spiral on said dielectric structure, said one or more conductors having leads formed integrally therewith, at least some of said leads extending from said substrate to at least some of said contacts on said chip, wherein at least some of said leads include frangible sections.

5. A chip assembly, comprising:
   (a) a chip having a front surface with contacts thereon;
   (b) a generally planar substrate overlying said front surface, said substrate including a planar dielectric structure and a first inductor including one or more conductors extending in a spiral on said dielectric structure, said one or more conductors having leads formed integrally therewith, at least some of said leads extending from said substrate to at least some of said contacts on said chip, wherein at least some of said leads include first and second lead portions, each said first portion having an anchor end affixed to said dielectric structure at a first side of said bonding window and a displaceable end remote from such first side, each said second portion having an anchor end affixed to said dielectric structure at a second side of said bonding window and a displaceable end remote from such second side.

6. A chip assembly as claimed in claim 1, wherein at least some of said leads are curved in said horizontal plane.

7. A chip assembly as claimed in claim 1, wherein said chip incorporates at least one passive component selected from the group consisting of resistors and capacitors.

8. A chip assembly as claimed in claim 2, wherein said dielectric structure includes one or more bonding windows, said leads extending into alignment with said one or more bonding windows.

9. A chip assembly as claimed in claim 2, wherein at least some of said leads include frangible sections.

10. A chip assembly as claimed in claim 2, wherein at least some of said leads include first and second lead portions, each said first portion having an anchor end affixed to said dielectric structure at a first side of said bonding window and a displaceable end remote from such first side, each said second portion having an anchor end affixed to said dielectric structure at a second side of said bonding window and a displaceable end remote from such second side.

11. A chip assembly as claimed in claim 2, wherein at least some of said leads are curved in said horizontal plane.

12. A chip assembly as claimed in claim 2, wherein said chip incorporates at least one passive component selected from the group consisting of resistors and capacitors.

13. A chip assembly as claimed in claim 1, wherein at least some of said leads include frangible sections.

14. A chip assembly as claimed in claim 1, wherein at least some of said leads include first and second lead portions, each said first portion having an anchor end affixed to said dielectric structure at a first side of said bonding window and a displaceable end remote from such first side, each said second portion having an anchor end affixed to said dielectric structure at a second side of said bonding window and a displaceable end remote from such second side.

15. A chip assembly comprising:
(a) a chip having a front surface with contacts thereon;
(b) a substrate overlying said front surface, said substrate including a dielectric structure having a major surface extending in a first direction and in a second direction transverse to said first direction, said first and second directions being at least generally parallel to said front surface, said substrate further including a first inductor including one or more conductors extending in a spiral on said dielectric structure, said one or more conductors having leads formed integrally therewith, at least some of said leads extending in a third direction away from said major surface towards at least some of said contacts on said chip, and a second inductor including one or more conductors extending in a spiral on said dielectric structure and second inductor leads formed integrally with the one or more conductors of said second inductor, said second inductor overlying said first inductor so that said first inductor is disposed between said second inductor and said chip, said second inductor leads being connected to said chip, one or more of said second inductor leads extending through said first inductor between turns thereof.

16. A chip assembly as claimed in claim 15, wherein said dielectric structure includes one or more bonding windows, said leads extending into alignment with said one or more bonding windows.

17. A chip assembly as claimed in claim 15, wherein at least some of said leads include frangible sections.

18. A chip assembly as claimed in claim 15, wherein at least some of said leads include first and second lead portions, each said first portion having an anchor end affixed to said dielectric structure at a first side of said bonding window and a displaceable end remote from such first side, each said second portion having an anchor end affixed to said dielectric structure at a second side of said bonding window and a displaceable end remote from such second side.

19. A chip assembly as claimed in claim 15, wherein at least some of said leads are curved in said horizontal plane.

20. A chip assembly as claimed in claim 15, wherein said chip incorporates at least one passive component selected from the group consisting of resistors and capacitors.

* * * * *